United States Patent [19]
Baldwin et al.

[11] Patent Number: 5,420,986
[45] Date of Patent: May 30, 1995

[54] FDDI CONCENTRATOR WITH BACKPLANE PORT FOR DUAL DATAPATH SYSTEMS

[75] Inventors: Christopher Baldwin, Arlington; John Iannarone, Tewksbury, both of Mass.

[73] Assignee: Digital Equipment Corporation, Maynard, Mass.

[21] Appl. No.: 922,144

[22] Filed: Jul. 30, 1992

[51] Int. Cl.⁶ .................. H04L 12/42; G06F 13/12
[52] U.S. Cl. ........................ 395/325; 395/200; 340/825.05; 370/85.5; 364/242.94; 364/242.96; 364/284.4; 364/241.9; 364/238; 364/241.8; 364/DIG. 1
[58] Field of Search ............... 395/325, 275, 200; 370/85.12, 85.15, 85.5; 340/825.05

[56] References Cited
U.S. PATENT DOCUMENTS

| | | | |
|---|---|---|---|
| 4,731,784 | 3/1988 | Keller et al. | 359/136 |
| 4,777,657 | 10/1988 | Gillaspie | 455/186.1 |
| 4,789,982 | 12/1988 | Coden | 370/85.5 |
| 4,803,485 | 2/1989 | Rypinski | 340/825.05 |
| 4,847,611 | 7/1989 | Bekki et al. | 340/825.05 |
| 4,866,704 | 9/1989 | Bergman | 370/85.4 |
| 4,899,142 | 2/1990 | Nakayashiki et al. | 340/825.05 |
| 4,935,926 | 6/1990 | Herman | 370/85.13 |
| 4,937,823 | 6/1990 | Bekki et al. | 371/11.2 |
| 4,951,280 | 8/1990 | McCool et al. | 370/85.12 |
| 4,985,888 | 1/1991 | Madge et al. | 370/85.5 |
| 5,034,738 | 7/1991 | Ishihara | 340/825.05 |
| 5,065,397 | 11/1991 | Shiobara | 370/85.5 |
| 5,087,911 | 2/1992 | Green et al. | 340/825.05 |
| 5,101,405 | 3/1992 | Bekki et al. | 370/85.15 |
| 5,132,832 | 7/1992 | Matz et al. | 359/137 |
| 5,181,858 | 1/1993 | Matz et al. | 439/188 |
| 5,301,303 | 4/1994 | Abraham et al. | 395/500 |
| 5,307,463 | 4/1994 | Hyatt et al. | 395/275 |

Primary Examiner—Gopal C. Ray
Attorney, Agent, or Firm—Cesari and McKenna

[57] ABSTRACT

A concentrator which is used alone or in conjunction with one or more identical concentrators provides a set of externally configurable datapaths for connecting other devices connected to a backplane with primary and/or secondary rings in a token ring network. The concentrator includes a controller, a plurality of multiplexers and several front panel and backplane ports, each of which is configurable as an A, B, M or S port. The concentrator includes an internal token ring chain of one or more front panel ports for connecting other devices to the rings.

20 Claims, 18 Drawing Sheets

BPn = Backplane port
FPn = Front Panel port

BPn = Backplane port
FPn = Front Panel port

FDDI CONCENTRATOR WITH BACKPLANE PORT FOR DUAL DATAPATH SYSTEMS

BACKGROUND OF THE INVENTION

1. Field of the Invention

The present invention relates to a concentrator which can be plugged into a bus backplane to insert other devices connected to the bus into a token ring network having a primary and a secondary ring. More specifically the invention relates to a concentrator which is used alone or in conjunction with a second identical concentrator to provide a set of externally configurable datapaths for connecting the bus backplane with primary and secondary rings in the network.

2. Description of the Related Prior Art

The invention involves token ring networks, primarily networks that conform to the ANSI FDDI standards X3.148, X3.139 and X3T9.5 (currently in draft form). However, while the devices specifically described herein conform to these standards, the invention is also applicable to other token ring standards.

In a token ring network the stations or "nodes" on the network are connected in a loop in which information signals propagate in a single direction. Thus, signals sent from one node to another will ordinarily pass through a number of intervening nodes in the course of travel along the ring. This arrangement raises a number of issues when it is desired to add nodes to, or remove them from, the network.

Specifically, the ring must be physically broken and its operation interrupted in order to add or remove a node. This is further complicated by the nature of the transmission medium, e.g. optical fiber or copper wire, that interconnects the nodes.

These problems have been addressed by the use of concentrators which are connected into the token ring and provide electrical and/or optical connections to various devices that can operate as token ring nodes. In a concentrator, the signal pathways are electrical, and thus, they can be switched electrically. They can therefore be switched fast enough to insert the nodes or chains of nodes into, or remove them from, the token ring without significantly interrupting the signal flow in the ring. Also, since these nodes can be electrically connected to the concentrator, they need not be provided with fiber optic interfaces and this reduces their cost.

The concentrators may also be provided with connectors that enable them to be plugged into backplanes to which token ring nodes are connected, thereby facilitating the physical connections between these nodes and the concentrators.

There are a number of different node arrangements which must be accommodated by the concentrators and this has required the use of different concentrator designs for these arrangements. In turn, this requires the manufacture and stocking of different concentrators. The present invention is directed primarily to a reduction in the costs associated with these factors.

The ANSI FDDI standards support several different types of ports, namely, A ports, B ports, M ports and S ports. Each port accommodates a particular type of connection. For example, an A port connects to the incoming primary ring and the outgoing secondary ring of the token ring network, a B port connects to the outgoing primary ring and the incoming secondary ring, an M port which operates only on a concentrator and connects the concentrator to a station or to another concentrator connects to the same incoming and outgoing ring, and an S port which operates on a station or a concentrator and connects a concentrator to a single attachment station or a single attachment concentrator connects to the same incoming and outgoing ring. The operating characteristics of these ports are set forth in more detail in FDDI standard X3T9.5, which is currently in draft form, relevant portions of this draft standard are attached hereto as appendix A. Although the hardware for these ports is basically the same, firmware configures the ports for the particular uses. The FDDI standard permits connections between A ports and B ports and between M ports and either A ports and B ports. However, two M ports may not be connected together. What is needed is a concentrator with a number of ports and datapaths which can be readily configured to accommodate the connection of various arrangements of devices to the token ring network.

DESCRIPTION OF THE INVENTION

SUMMARY OF THE INVENTION

The invention is a concentrator that provides a set of remotely controllable and configurable datapaths which can be used to connect a token ring network having a primary and a secondary ring to various token ring nodes.

Specifically, the concentrator includes a plurality of ports. Several of the ports are front panel ports and at least two of the ports are backplane ports. Each port may be configured by firmware to be an A port, a B port, an M port or an S port which complies with the FDDI standard. A concentrator which will be connected directly to a standard token ring preferably includes at least one front panel port which operates as an A port or a B port, and it may include two such ports, one A and one B. Each of the other front panel ports is configured as an M port and thus adapted to connect nodes or other concentrator cards into the primary and secondary rings. These front panel ports are all connected, through the concentrator, to form an internal token ring chain.

The backplane ports enable the concentrator to plug into a backplane, which connects the concentrator to an electrically linked external chain of token ring nodes which are also connected to the backplane. The concentrator may, through its backplane ports, also connect to other concentrators to which other devices or concentrators are connected.

A plurality of multiplexers in the concentrator provide configurable datapaths among the ports. The multiplexers are controlled by a controller present on the concentrator, which operates as a regular node on a token ring and thus can receive and transmit token ring information signals. In response to configuration information sent to the controller by a system manager, the controller can reconfigure the datapaths by instructing the multiplexer to select particular path lines.

The controller may, for example, instruct the multiplexers to select datapaths which convey signals between either the primary or the secondary token ring and the backplane and convey the signals on the other ring directly through the concentrator to the next node on that ring. This will insert into the selected ring a token ring chain connected to the backplane. Also, the controller may configure the datapaths to insert an internal token ring chain into either of the token rings.

If desired, this can be combined with coupling of the selected ring to the backplane.

Other functions can be provided by linking two or more concentrators to form a concentrator assembly and plugging one or more of these concentrators into the backplane.

It will be apparent that since the invention provides a variety of functions with a single concentrator design, it reduces the number of different concentrators which need to be manufactured and stocked to support the various datapath configurations.

Moreover, as will be seen, the arrangement described herein efficiently uses the various components in the concentrator. That is, substantially all of the components are used, regardless of the datapath configuration to which the concentrator is set.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE INVENTION

THE PREFERRED EMBODIMENT

Figure 1:
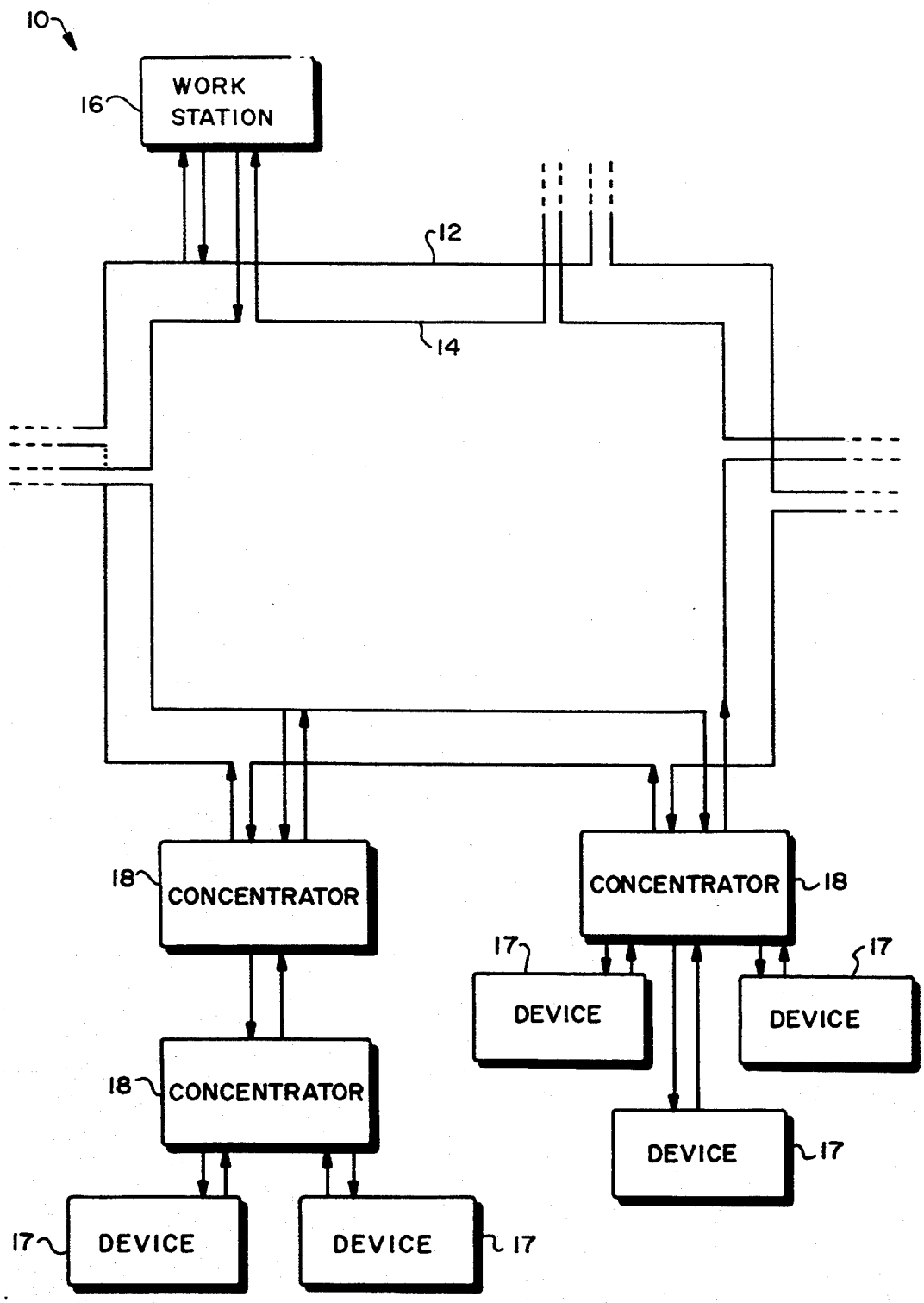
FIG. 1 depicts a portion of an FDDI token ring network.

In FIG. 1, reference numeral 10 refers generally to a token ring network having a primary ring 12 and a secondary ring 14. One or more devices 16 such as workstations connect directly to the rings 12 and 14. Other devices 17 connect to the rings via concentrators 18. Likewise, a concentrator 18 may connect to the rings via another concentrator 18.

Figure 2:
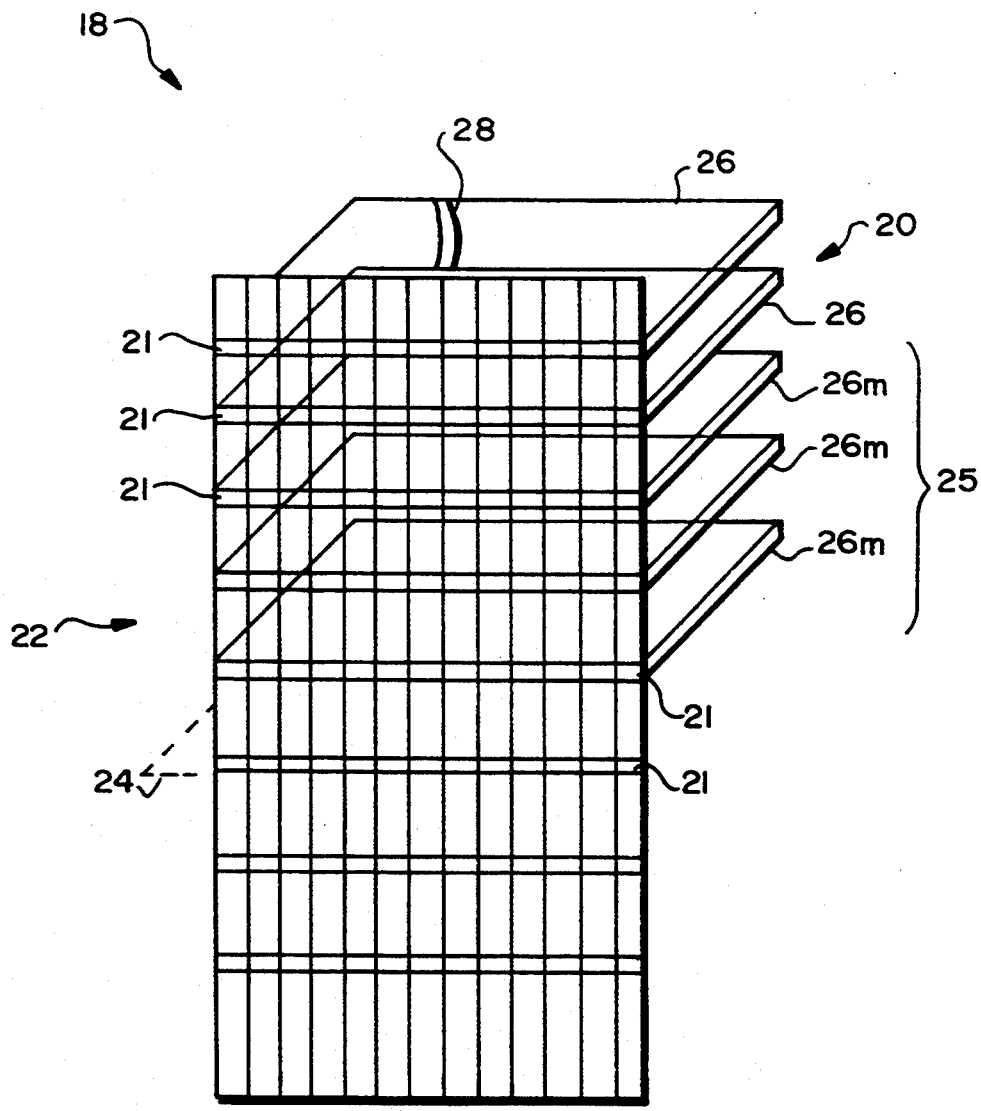
FIG. 2 depicts a concentrator within the FDDI network of FIG. 1.

As shown in FIG. 2, a concentrator 18 includes one or more cards 26 embodying the invention, which may be inserted into corresponding slots 21 in a backplane 22. The backplane 22 includes a plurality of channels 24. Each card connected to the backplane 22 connects to four backplane channels 24, two for transmitting signals to the backplane and two for receiving signals therefrom. Also each card plugs into power lines in the backplane, which provides power to the components on the card.

An external token ring chain 25 comprises one or more cards 26 m configured as "M Port" cards, which are also plugged into the backplane 22. The backplane channels 24 interconnect the external chain 25 and a card 26 that is connected into the token ring 12 or 14, so that the chain 25 is inserted into the token ring 12 or 14 by way of pathways in the card 26. As will be seen, a concentrator may consist of solely one or two cards 26 connected to the token ring and may contain some number of cards 26 configured as M port cards. Also, as described in more detail below, concentrators may be connected in a tree-formation to provide multiple ports for the connection of devices 17.

Figure 3:
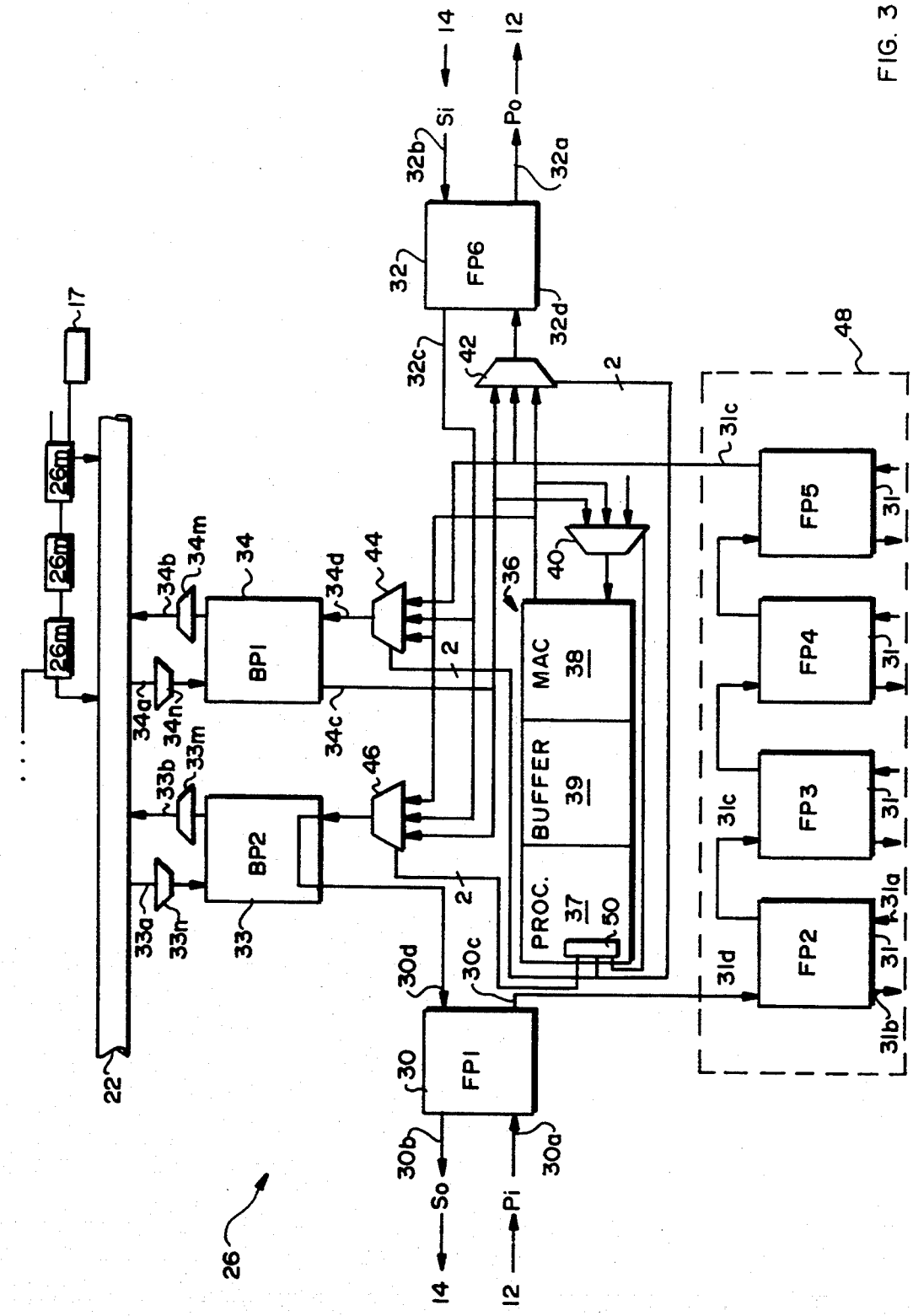
FIG. 3 shows a preferable design of a card embodying the invention within the concentrator of FIG. 2.

The concentrator preferably includes one card 26 for connecting the backplane 22 to either ring 12 or ring 14, or two interconnected cards 26 for connecting both rings to the backplane. As shown in FIG. 3, some of the port cards 26 may also connect additional devices 17 into the token rings.

FIG. 3 illustrates a preferable design for a card 26. The card includes various front panel and backplane ports 30–34, each of which may be configured to operate as an A, B, S or M port. As depicted, the card 26 is configured with front panel ports 30 and 32 as A and B ports, respectively, which couple the card directly to the primary and secondary rings 12 and 14; front panel ports 31 as interconnected M ports, to couple connected devices to the rings through the card; and backplane ports 33–34 as M ports to couple the card and connected devices to the backplane. The operation of the card and the various ports, configured as A, B and M ports in FIG. 3 is discussed below. The operations of the card and the ports in other configurations are discussed below with referenced to FIGS. 4–8.

Referring still to FIG. 3, the A port 30 includes an external input port 30a for receiving signals on the primary ring 12 and an external output port 30b for transmitting on the secondary ring 14. The B port 32 includes an external output port 32a for transmitting on the primary ring 12 and an external input port 32b for receiving on the secondary ring 14. The A port 30 and the B port 32 also have internal input ports 30c and 32c, and internal output ports 30d and 32d, which are electrically connected to other components on the card 26. These ports are associated with the respective external ports 30a, 30b, 32a and 32b such that signals received at external input port 30a, for example, leave the A port unit 30 at internal input port 30c, and signals received at the internal output port 30d leave the A port unit at the external output port 30b.

A token ring 12 or 14 may use any type of transmission medium such as a fiber optic or electrical cable. The A port 30 and the B port 32 convert the optical signals used on the rings 12 and 14 into electrical signals, and vice versa, as necessary. Preferably, each of the port units 30 and 32 has a built-in loop-back path so that when its external ports are not connected to a token ring 12 or 14, the unit loops signals from its internal output port back to its internal input port front panel ports 31 and backplane ports 33-34 have built-in loop-back paths, also.

The backplane ports 33-34 include external input and output ports 33a, 34a and 33b, 34b for connecting the card to the backplane 22. The backplane ports 33-34 may also be used to connect two or more cards 26 together over the backplane, as discussed in more detail with reference to FIG. 6 below.

A controller 36 on the card 26 is an addressable token ring entity. It operates as a node on the token ring 12 or 14, depending on the configuration of the card. The card 26 further includes a plurality of multiplexers which are interconnected to provide a set of externally controllable and selectable datapaths. The controller 36, which is connected to the select lines of the multiplexers, controls the operations of the multiplexers, based on signals sent from, for example, a system manager, or a connected console (not shown).

As depicted in FIG. 3, the signals received at the external input port 30a of A port unit 30 are converted to electrical signals by the port unit 30, as necessary, and transferred via internal input port 30c to the front panel ports 31. The signals are transmitted through the front ports 31, which are connected as an internal chain 48 of M port units, and then to multiplexers 40, 42, 44 and 46. If no external device is connected to the external ports 31a and 31b of any of M port units 31, the loop-back function of the M ports passes the signals from the input port 30c of the A port unit 30 directly along the internal chain 48. If one or more devices 17 are connected to particular M ports, these ports each send the signal through the connected device 17 before sending it to the next port on the chain. The signals may thus be modified as they are transmitted through the internal chain 48.

The multiplexer 40, which selects the input for the controller 36, is connected to receive as further inputs the signals from the internal input port 34c of backplane port unit 34. The controller 36 is connected to transmit its output to the multiplexers 46 and 44, which are connected to the backplane ports 33 and 34, respectively, and to multiplexer 42, which is connected to B port 32.

Optionally, the multiplexer 40 is also connected to receive, as a further input, signals from the controller 36. This is useful for diagnostic purposes such as testing the controller hardware.

The multiplexer 44 is further connected to receive the signals from the internal input port 31d, of the port unit 31 which is at the end of internal chain 48, and signals from the internal input port 32c of B port unit 32. This multiplexer selects the input to the internal input port 34a of backplane port unit 34.

The multiplexer 46 is further connected to receive the signals from the internal input port 31c of the end port unit of the chain 48 and signals from the internal input port 34c of backplane port unit 34. This multiplexer selects the input signals for the backplane port 33. As depicted, the backplane port 33 loops the signals directly to its internal input port 33c, which is connected to the A port 30. The multiplexer 46 thus selects the signals which the A port 30 is to transmit over the secondary ring 14.

Multiplexers 33m and 33n, and 34m and 34n, which are also controlled by the controller 36, allow the backplane ports 33 and 34, respectively, to connect to the channels of the backplane. The multiplexers 33m,n and 34m,n are connected between the external input and output ports of the backplane ports 33 and 34 and the various channels of the backplane 22. The multiplexers 33m and 34m each receive signals from the associated backplane port and pass the signals to a selected channel of the backplane. Similarly, the multiplexers 33n and 34n each receive signals from a selected backplane channel and pass the signals to the backplane ports 33 and 34, respectively. If either or both of the ports 33 and 34 are not connected to the backplane, the port loop back feature passes the signals received through internal input port 33a or 34a to internal output port 33d or 34d, as appropriate. The signals thus are not passed to multiplexers 33m or 34m.

The controller 36 preferably includes a processor 37, a MAC 38 and a packet memory 39. In response to messages sent to the controller over one of the token rings, the processor 37 loads a register 50 whose bits control the input selections of the various multiplexers, and thus, configure the signal pathways on the card 26. At start-up, the processor 37 loads into the register 50 a predetermined bit pattern which configures the card in a default configuration, with the controller 36 receiving signals from a selected one of the rings 12 or 14. Thereafter, in response to configuration information received over the selected ring, the microprocessor 37 loads into the register 50 a pattern of bits which controls the states of the multiplexer selection lines such that the multiplexers select, or output, the particular lines which configure the data pathways in accordance with the received configuration information. For example, the controller 36 may receive instructions to connect the primary ring to the backplane and in response load into register 50 the bit pattern which corresponds with the multiplexers selection of the particular lines discussed below with reference to FIG. 4.

We shall now describe various pathway configurations that one can accomplish by control of the various multiplexers on the card 26. In the FIGS. 4-5, front panel ports 30 and 32 are configured as A and B ports, respectively, and the paths involving the primary token ring 12 are depicted with dashed lines and the paths involving the secondary ring 14 are depicted with dotted lines. Multiplexers 33m,n and 34m,n, which allow backplane ports 33 and 34 to connect to the backplane 22 are not shown.

A single card 26 permits the selection of datapaths to insert into either the primary ring 12 or the secondary ring 14 an external token ring chain connected to the backplane 22. The card 26 also provides datapath selection to insert the internal token ring chain 48 of M ports 31 into the primary ring 12 or secondary ring 14.

Figure 4:
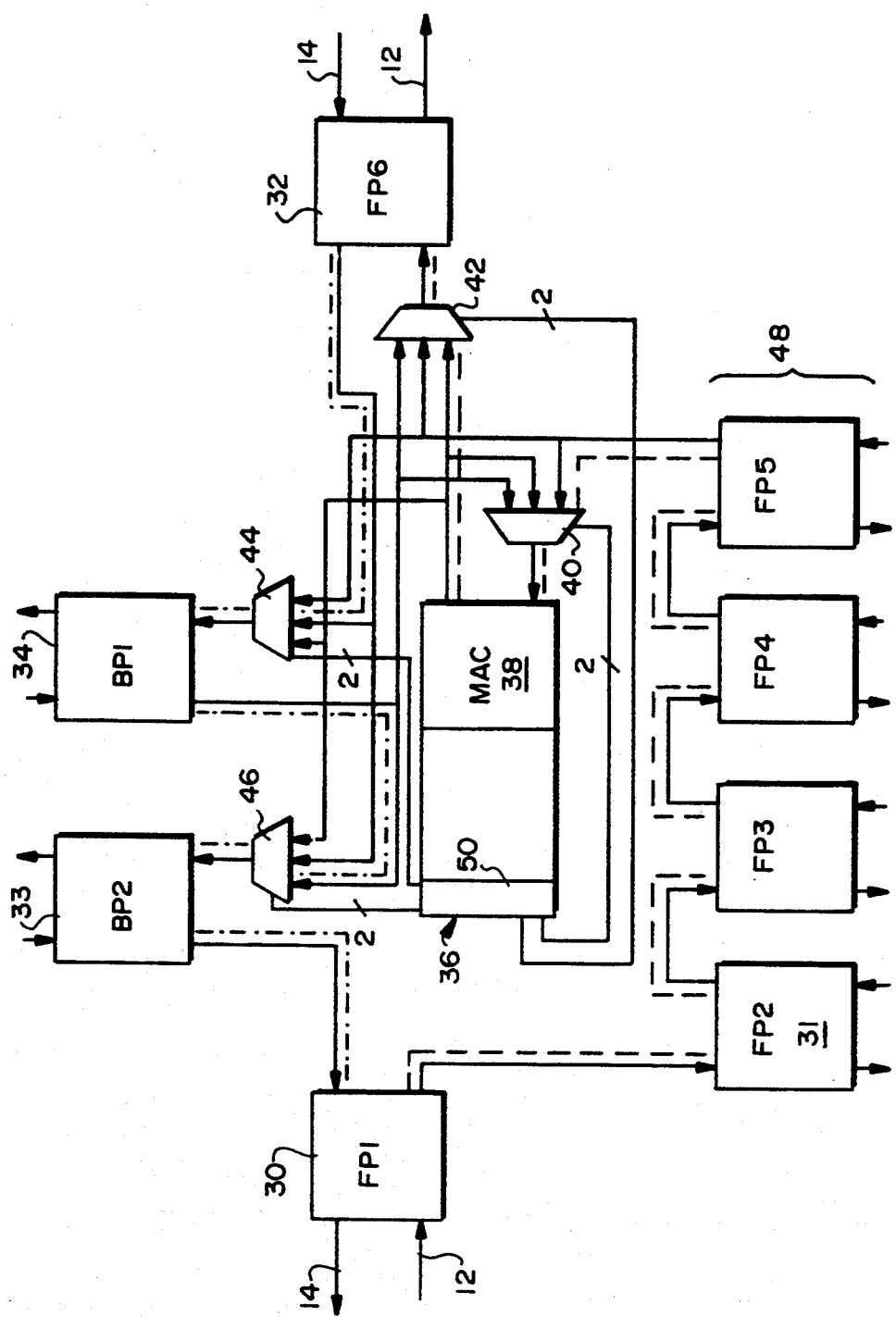
FIG. 4 illustrates datapaths on a card of FIG. 3 for connecting a primary token ring to a backplane and keeping a secondary token ring on the card.

FIG. 4 illustrates the configuration of a card 26 which inserts into the primary token ring 12 an internal chain 48 of M port units 31 and an external chain of token ring nodes 27 (shown in FIG. 3) plugged into the backplane 22. Signals received by A port 30 are passed to internal chain 48 via internal input port 30c. The signals pass in daisy chain fashion through the chain, with possible modifications by devices 17 connected to the M ports, in accordance with the FDDI protocol. The output of the last M port in the chain is selected by the multiplexer 44 for transmission to the backplane port 34. The port 34 is connected to a backplane channel 24a and, from the channel 24a, the signals pass into the input end of the external token ring chain 27.

The signals from the output end of chain 27 are applied to the channel 24b, to which the external input port 34c of port unit 34 is connected. The multiplexer 40 selects the signals from the internal input port 34c and passes them to the controller 36. The signals from the controller, in turn, are selected by the multiplexer 42 for transmission to the ports 32d and 32a.

In the secondary data path, the multiplexer 46 selects the signals from the ports 32b, 32c and transmits them, via multiplexer 46 and unused port unit 33 to the ports 30d, 30b.

Figure 5:
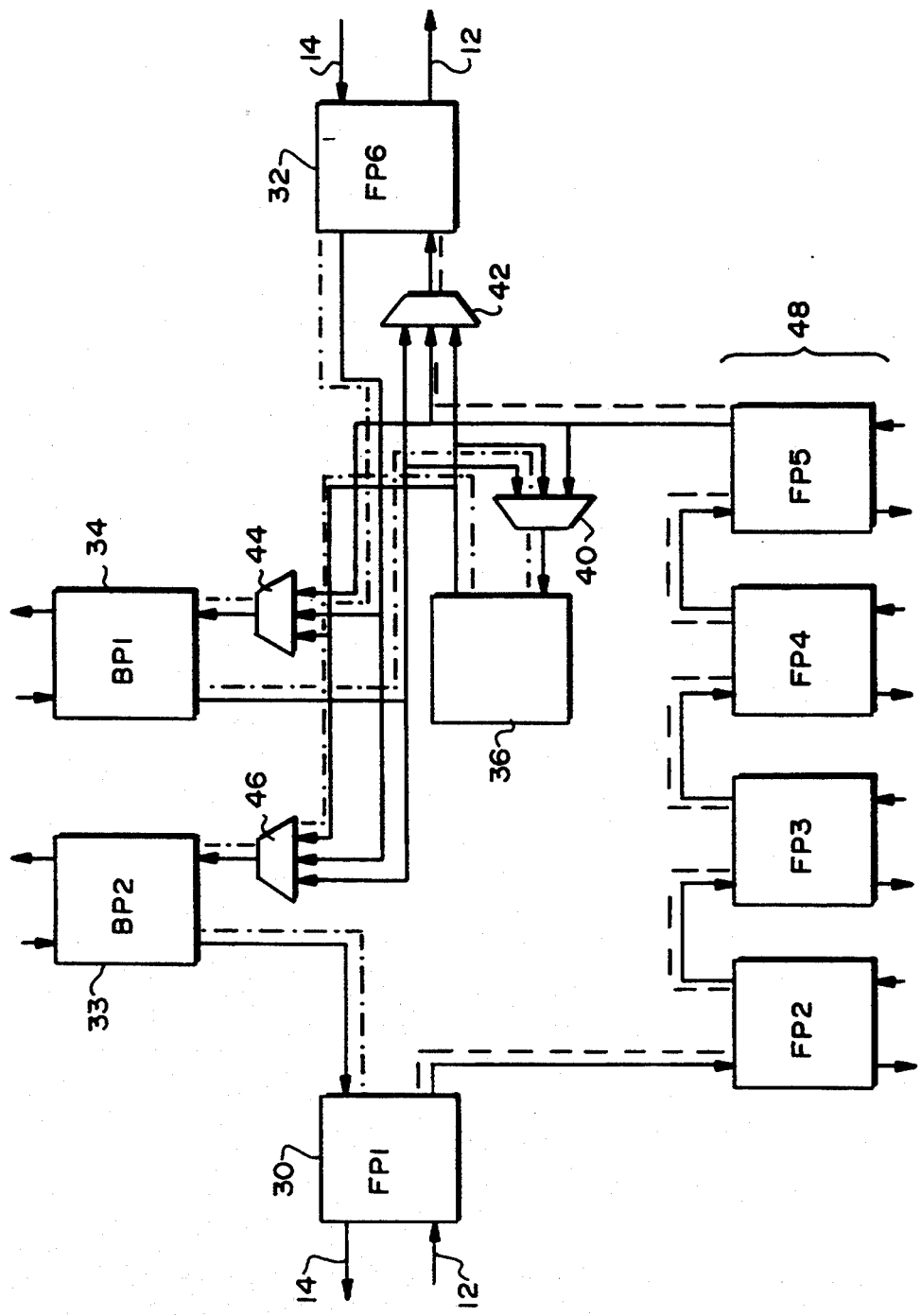
FIG. 5 shows datapaths on a card of FIG. 3 for connecting a secondary token ring to a backplane and keeping a primary token ring on the card.

In the data path configuration shown in FIG. 5, a single card 26 transmits the signals from the secondary ring 14 through the backplane 22, and transmits the signals from the primary ring 12 through the card from the input port 30a to the output port 32a by way of the internal chain 48 and the multiplexer 42. The secondary data path passes, as shown, through multiplexer 44 to the backplane, through the external chain 25 (FIG. 3) connected to the backplane 22, to multiplexer 40 which selects these signals to pass to the controller 36. The controller 48 sends the signals to multiplexer 46 which sends them via unused port unit 33 to ports 30d, 30b.

Figure 6:
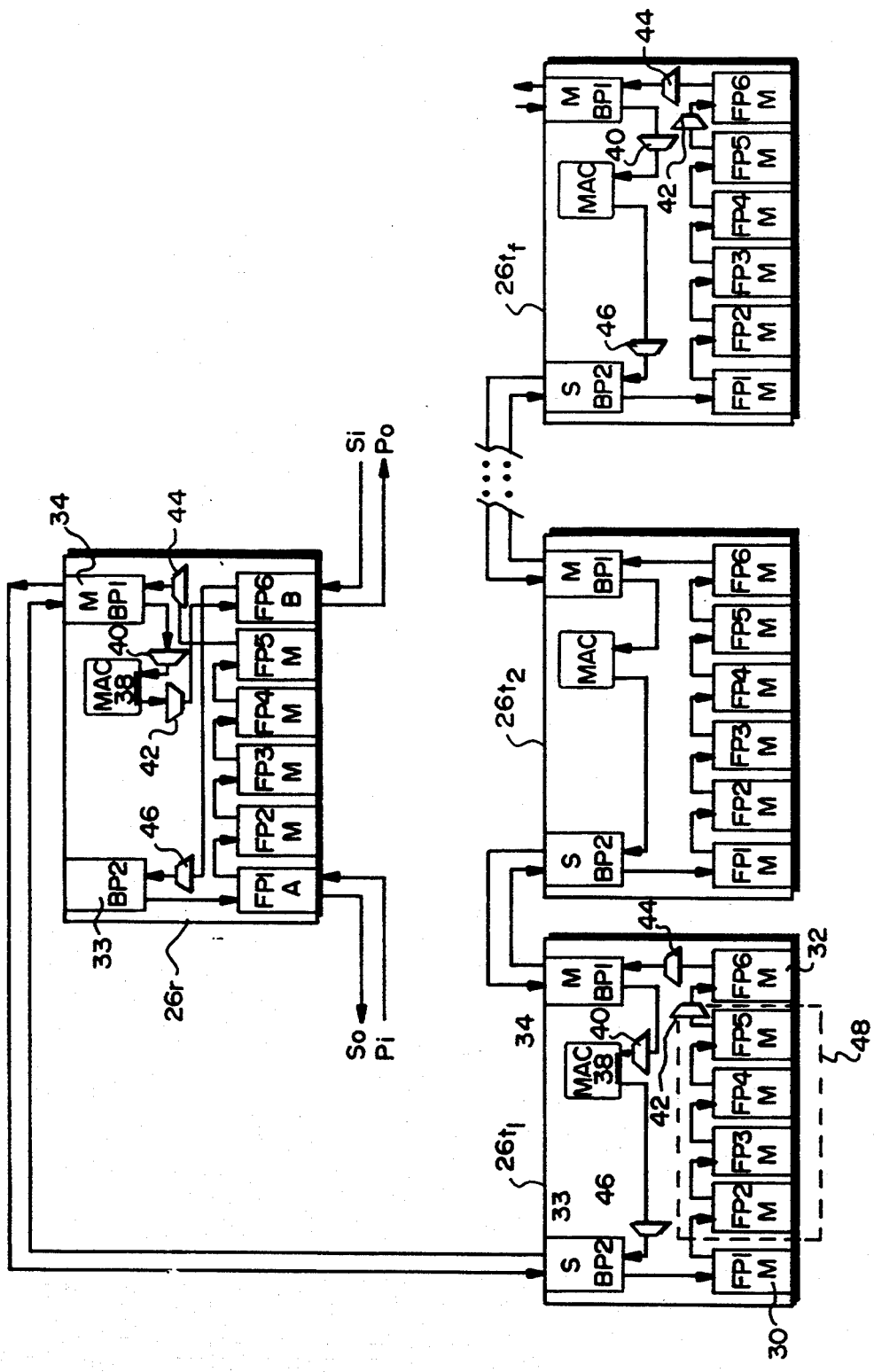
FIG. 6 depicts an arrangement in which cards and devices are connected to the concentrator card of FIG. 3 in a tree-formation.

FIG. 6 illustrates a tree formation of concentrator cards, with card 26r operating as the "root" of the tree and connecting the various other cards 26t and associated devices 17 connected to the M ports 31 (not shown) to the primary and secondary rings 12 and 14. The root card 26r is configured in the same manner as the cards depicted in FIGS. 3 and 4. Thus, the signals on the primary ring 14 travel via A port 30 through daisy chained M ports 31 to backplane M port 34 onto the backplane 22. The signals then travel over the backplane to connected card $26t_1$. The backplane port 33 of card $26t_1$ is configured as an S port, which operates as a single access connection, that is, it imports signals associated with one ring from the backplane and exports signals associated with the same ring on to the backplane.

The S port 33 transmits signals which it receives over the backplane to front panel port 30, which is configured as an M port. This port 30 connects directly into the daisy chain of M ports 31 and thus the signals travel through the internal chain 48 to the final M port 31 on the chain 48. This M port transmits the signals through multiplexer 42 to port 32 which is now configured as an M port. Since port 32 is unused, it loops signals on its input port directly to its output port to multiplexer 44. Multiplexer 44 selects these signals for transmission to backplane port 34. Port 34 then transmits the signals over the backplane to card $26t_2$.

Card $26t_2$ is configured in the same manner as card $26t_1$ and thus signals received by backplane port 33 are transmitted through the front panel M ports 30–31 and the various multiplexers to backplane port 34. The signals are then transmitted from this backplane port to backplane port 33 on a next card $26t_3$ (not shown), and so forth, until the signals reach a final card $26t_1$ on the tree. At this card, backplane port unit 34, which is unused on the final card, loops the signals through the port to multiplexer 40. Multiplexer 40 selects these signals for transmission to the controller 36, and the controller transmits the signals through multiplexer 46 to backplane port 34. This backplane port sends the signals over the backplane 22 to the card 26, which precedes it in the tree. The signals are similarly transmitted through the various cards on the tree until they are transmitted from card $26t_1$ back to the root card 26r. Port 34 receives these signals and transmits them through the multiplexer 40 to the controller 36. The controller 48 then transmits the signals through multiplexer 42 to B port 32, which is connected to the primary ring 12. As discussed above with reference to FIG. 4, signals on the secondary ring travel directly through card 26r without transmission on the backplane 22. Accordingly, these signals do not travel through the other cards in the tree formation.

Figure 7:
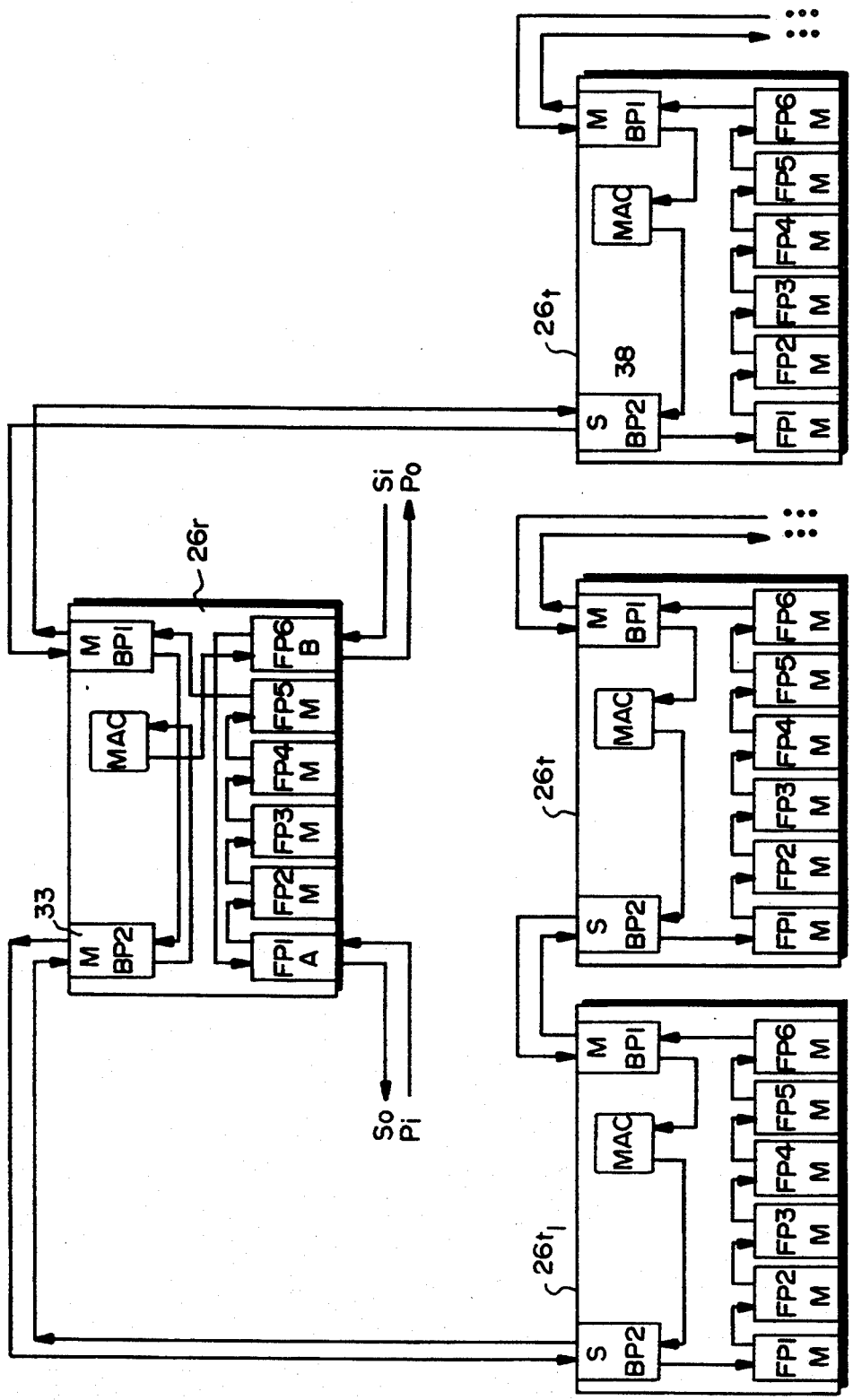
FIG. 7 shows datapaths of an alternate tree-formation arrangement.

An alternative arrangement including a tree formation is shown in FIG. 7. In this arrangement, both backports 33 and 34 of root card 26r are used to attach various cards 26t in the tree-formation. These cards 26t may or may not be attached to other cards 26t through the backplane. This arrangement operates in a manner which is similar to the arrangement in FIG. 6, however, the backplane ports of root card 26r are connected together through the card such that signals received by backplane port 34 are routed directly to backplane port 33, through the port and to the associated connector cards 26t. The final connector card $26t_1$ on the tree connected to port 34 on the root card loops the signals back through its port 33, over the backplane to the card 26t previously connected on the tree and so forth, until the port 33 on the root card 26r receives the signals and sends them through the controller 48 and B port 32 to the primary ring 12.

Figure 8:
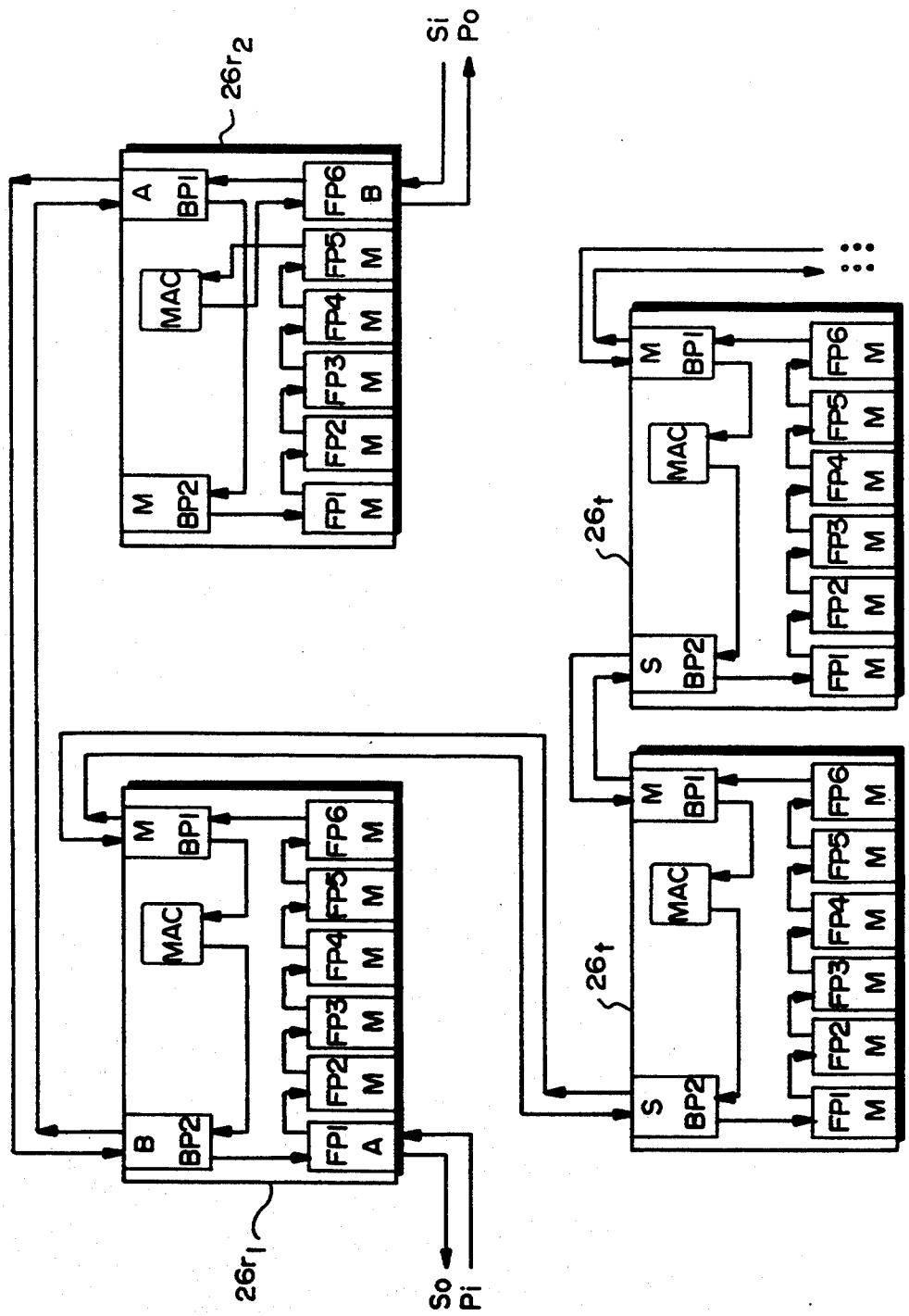
FIG. 8 depicts datapaths for a tree-formation arrangement which uses two cards to connect to the primary and secondary rings.

Two cards 26 can be connected to achieve additional functionality, and also, in a preferred arrangement, to achieve redundancy which protects against the disconnection of a tree formation of cards and devices due to the failure of a root card 26. FIG. 8 illustrates a tree formation of connectors with redundant root concentrators $26r_1$ and $26r_2$. Root card $26r_1$ includes a front port 30 which is configured as an A port for coupling the root card to the primary and secondary rings 12 and 14. The card is similar in operation to the root card 26r depicted in FIG. 6, however, the backplane port 33 on root card $26r_1$ is configured as a B port. This port exports signals to and imports signals from the backplane 22.

The redundant root concentrator card $26r_2$ receives signals over the backplane 22 via backplane port 34 which is configured as an A port. Signals received on the primary ring are transmitted through multiplexer 46 to backplane port 33. The backplane port loops the signals directly to front panel port 30 which is configured as an M port and can thus be used to connect various other cards or devices to the tree. This port sends the signals to the chain 48 of front panel ports 31. The root concentrator card $26r_1$ utilizes both its backplane ports, and through port 34 connects the root card to various tree cards $26_t$. Accordingly, signals, for example, transmitted on the primary ring are transmitted from root card $26r_1$ through tree cards $26t_1$ to an end card $26t_f$, and back through the various tree cards $26_t$ to the external input port of port unit 34 of root card $26r_1$.

The root card $26r_1$, sends the signals through the card and through backplane port 33, which as discussed above is configured as a B port, over the backplane to root concentrator card $26r_2$. This root concentrator card then transmits the signals through the card and back onto the primary ring 12 through its B port 32. An advantage of connecting the various cards across the backplane is that the front panel ports 30-32 are free for connection of various devices and cards. A further advantage achieved by connecting two, or redundant, root cards across the backplane is that if one of the root concentrator cards $26r_1$ or $26r_2$ fails, the remaining root concentrator card can be reconfigured electronically, and thus remotely, to connect through its A and B ports directly to the primary and secondary rings, and through a backplane port to the devices and other cards connected to the backplane. Accordingly, the failure will not disconnect from the rings the cards $26t$ and/or devices 17 connected to the root cards through the backplane. The failure will thus only disconnect the cards or devices connected to the failing root card through its front panel.

Figure 9:
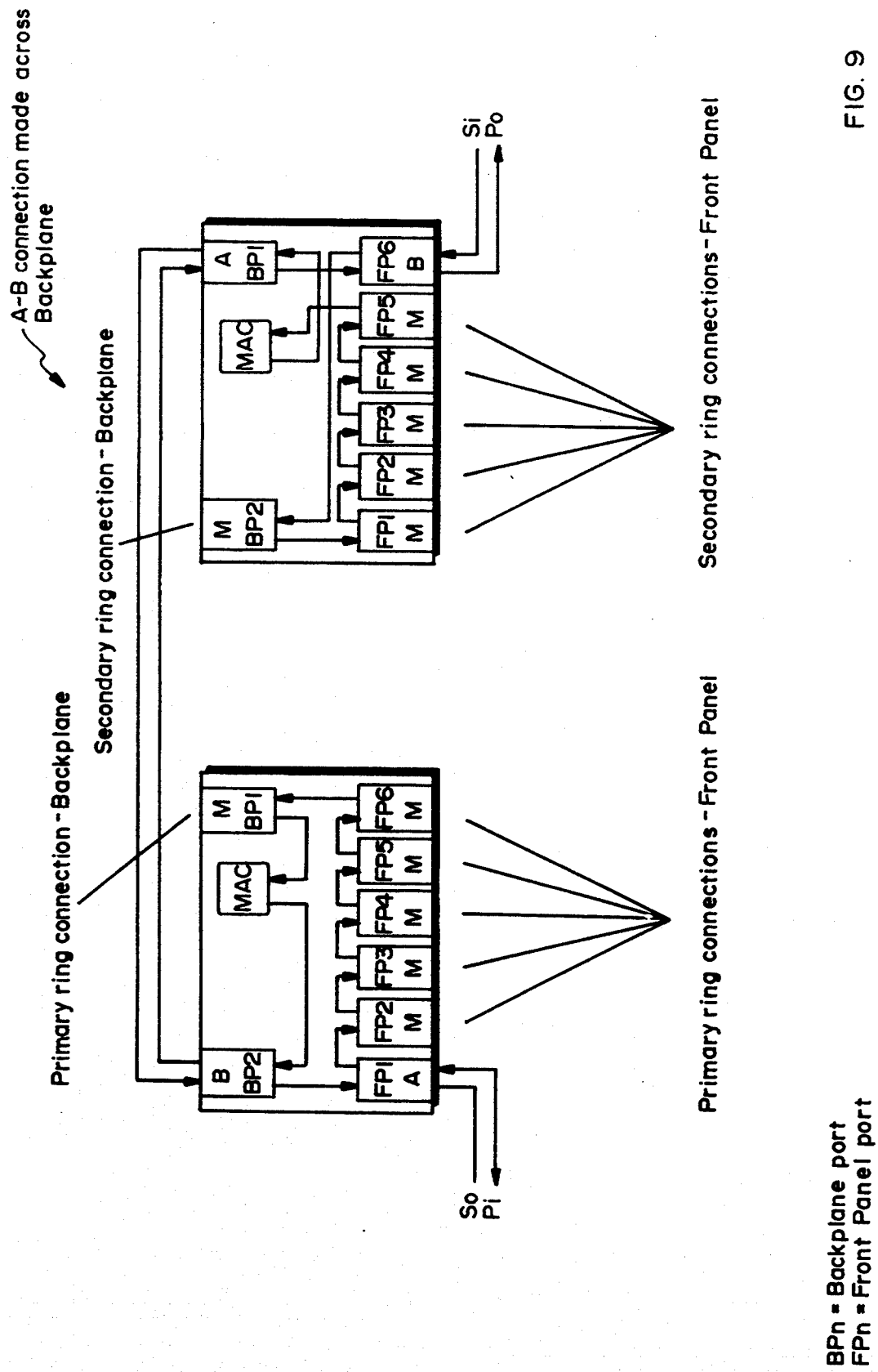
FIG. 9 depicts datapaths for an alternative arrangement which uses two cards to connect to the two rings.

Using two root concentrator cards $26r_1$ and $26r_2$ also gives one the flexibility of connecting associated devices and cards to either of the primary ring or the secondary ring. As illustrated in FIG. 9, root concentrator card $26r_1$ is connected in the same manner as described with reference to FIG. 8 and root card $26r_2$ is connected such that signals transmitted on the secondary ring 14 are received by B port 32, transmitted through multiplexer 46 to backplane port 33 and onto the backplane 22. Signals from the backplane 22 are imported to the card $26r_2$ by port 33 and sent through front panel ports 30-31 which are daisy chained to form internal chain 48. At the end of the daisy chain, the output signal is coupled to the controller 36 through multiplexer 40. Signals transmitted by the controller 36 are then transmitted through multiplexer 44 to backplane port 34 which is configured as an A port. The A port sends the signals to B port 33 on root card $26r_1$ which sends them directly to port 30. From this port, which is configured as an A port, the signals are sent to the secondary ring 14. This arrangement, which offers a user complete dual data path functionality, still uses only one type of card 26.

An alternative embodiment of the concentrator card is depicted in FIGS. 10-19. With this embodiment, a single card may be used to connect at the same time associated devices to the primary ring and various other associated devices to the secondary ring.

AN ALTERNATIVE EMBODIMENT

Figure 10:
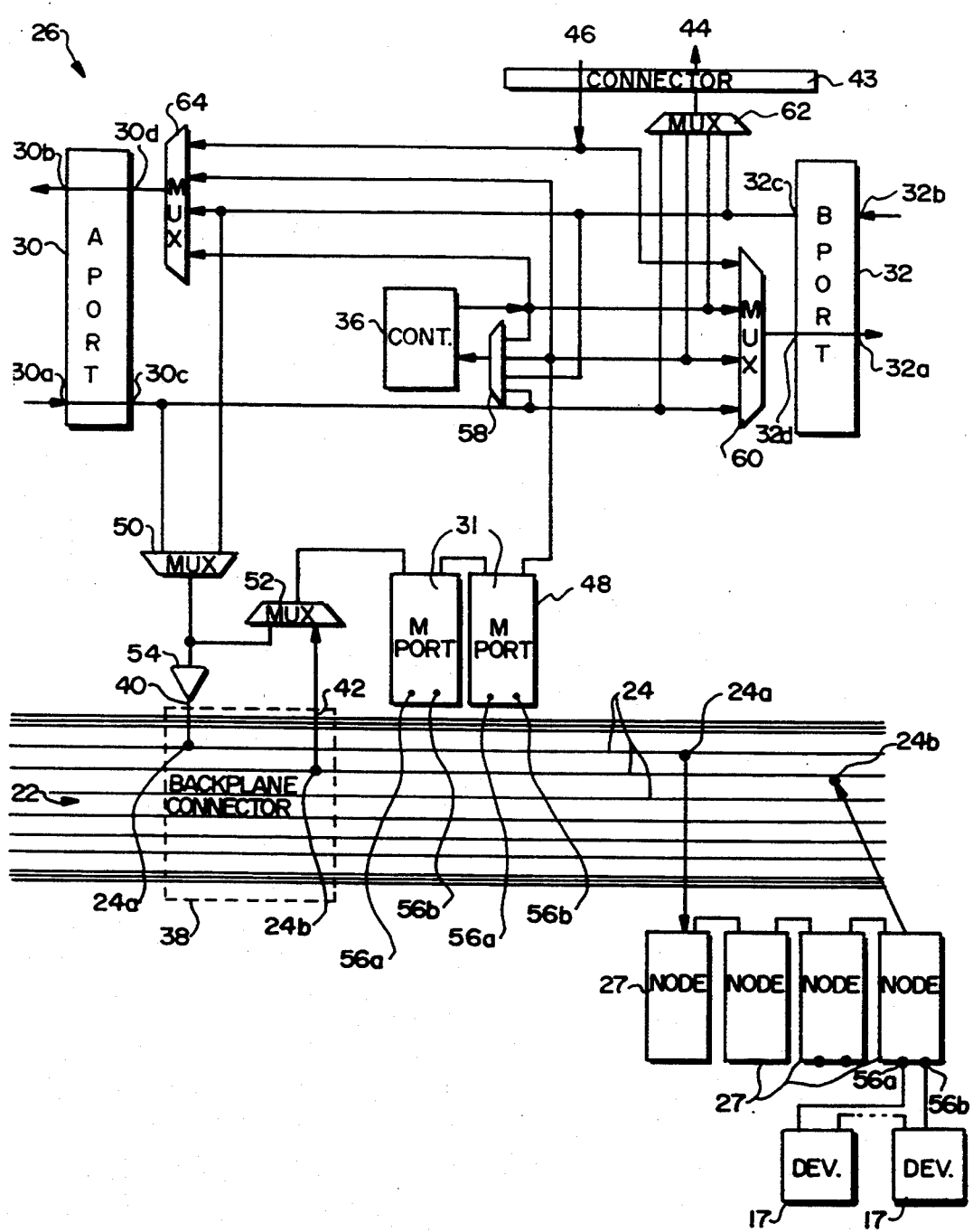
FIG. 10 shows an alternative design of a card embodying the invention within the concentrator of FIG. 2.

FIG. 10 illustrates an alternative preferable design for a card 65. The reference numbers associated with card 65 components which are the same as components on card 26 are identical to those used in describing card 26. In addition to A port 30 and B port 32, the card 65 includes a backplane connector 38 having a backplane output port 40 and a backplane input port 42 for connecting the card to the backplane 22. A cable connector 43 provides for external connections to an output port 44 and an input port 46.

The card 65 further includes a plurality of multiplexers which are interconnected to provide a set of externally controllable and selectable datapaths.

As shown in FIG. 10, a multiplexer 50 is connected to receive as inputs the outputs of the internal input port 30c and the internal input port 32c. The output of the multiplexer 50 is passed to the backplane output port 40, preferably, by way of a buffer amplifier 54. The multiplexer 50 output is also an input to a second multiplexer 52.

The multiplexer 52 is connected to receive as a further input the output of backplane input port 42. The output of the multiplexer 52 is transmitted through an internal chain 48 of optional M port units 31 on the card and then to multiplexers 58, 60, 62 and 64. If no external device is connected to the external ports 31a and 31b of any of M port units 31, the loopback function of the M ports passes the signals from the multiplexer 52 directly along the internal chain 48.

The multiplexer 58, which selects the input for the controller 36, is connected to receive as further inputs the signals from the ports 30c and 32c. The controller is connected to transmit its output to the multiplexers 60 and 62 and a multiplexer 64.

Optionally, the multiplexer 58 is also connected to receive, as a further input, signals from the controller 36. This is useful for diagnostic purposes such as testing the controller hardware.

The multiplexer 60 is further connected to receive the signals from the port 30c and the cable connector input port 46. This multiplexer selects the input to the internal port 32d.

The multiplexer 62 is further connected to receive the signals from the internal input port 32c and the port 30c. This multiplexer selects the input to the cable connector output port 44.

Finally the multiplexer 64 receives as further inputs the signals from the cable connector input port 46, and the port 32c. This multiplexer selects the input to the port 30d.

We shall now describe various pathway configurations that one can accomplish by control of the various multiplexers on the card 65. In the FIGS. 11-19, the paths involving the primary token ring 12 are depicted with diagonal cross hatching and the paths involving the secondary ring 14 are depicted with vertical hatching.

A single card 65 permits the selection of datapaths to insert into either the primary ring 12 or the secondary ring 14 an external token ring chain connected to the backplane 22. The card 65 also provides datapath selection to insert the internal token ring chain of M ports 48 into the primary ring 12 or secondary ring 14.

Figure 11:
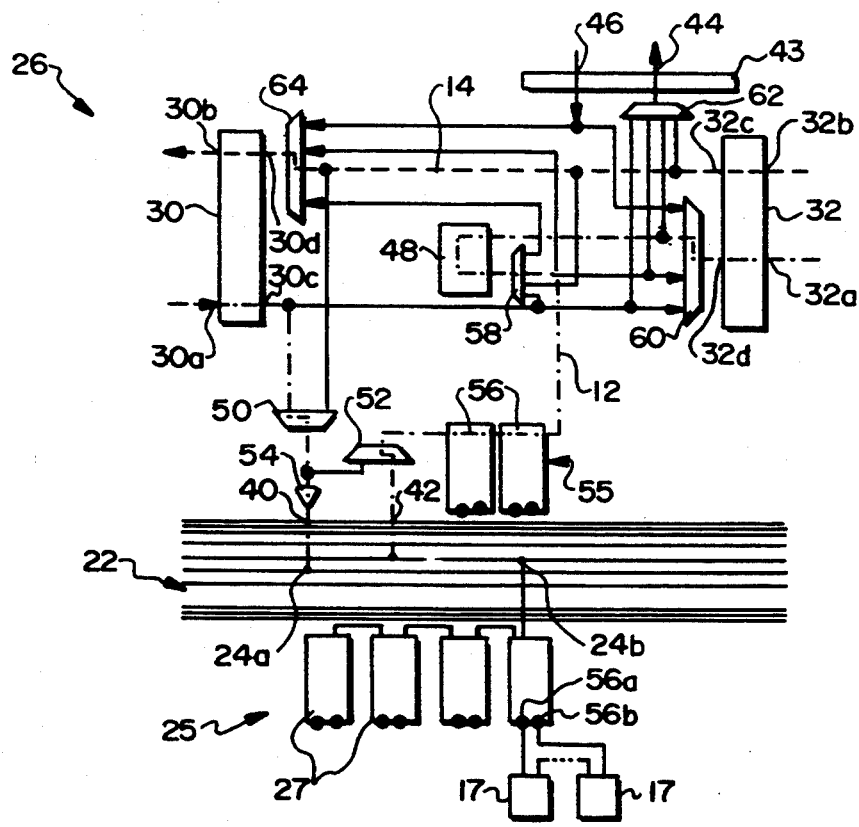
FIG. 11 illustrates datapaths on a card of FIG. 10 for connecting a primary token ring to a backplane and keeping a secondary token ring on the card.

In FIG. 11 we have illustrated the configuration of a card 65 to insert into the primary token ring 12 an internal chain 48 of M port units 31 and an external chain of token ring nodes 27 (shown in FIG. 3) plugged into the backplane 22. For the primary datapath, the multiplexer 50 selects the input from the port 30c and passes it to the port 40 by way of the amplifier 54. The port 40 is connected to a backplane channel 24a and, from the channel 24a, the signals pass into the input end of the external token ring chain 27. The signals from the output end of that chain are applied to the channel 24b, to which the port 42 is connected. The multiplexer 52 selects the signals from the port 42 and passes them to the first of the M ports 31 in the internal chain 48. The signals pass in daisy chain fashion through the chain 48, with possible modifications by devices 17 connected to the M ports, in accordance with the FDDI protocol. The output of the last M port in the chain is selected by the multiplexer 58 for transmission to the controller 36. The signals from the controller, in turn, are selected by the multiplexer 60 for transmission to the port 32d and 32a.

In the secondary data path, the multiplexer 64 selects the signals from the ports 32b, 32c and transmits them to the ports 30d, 30b.

Figure 12:
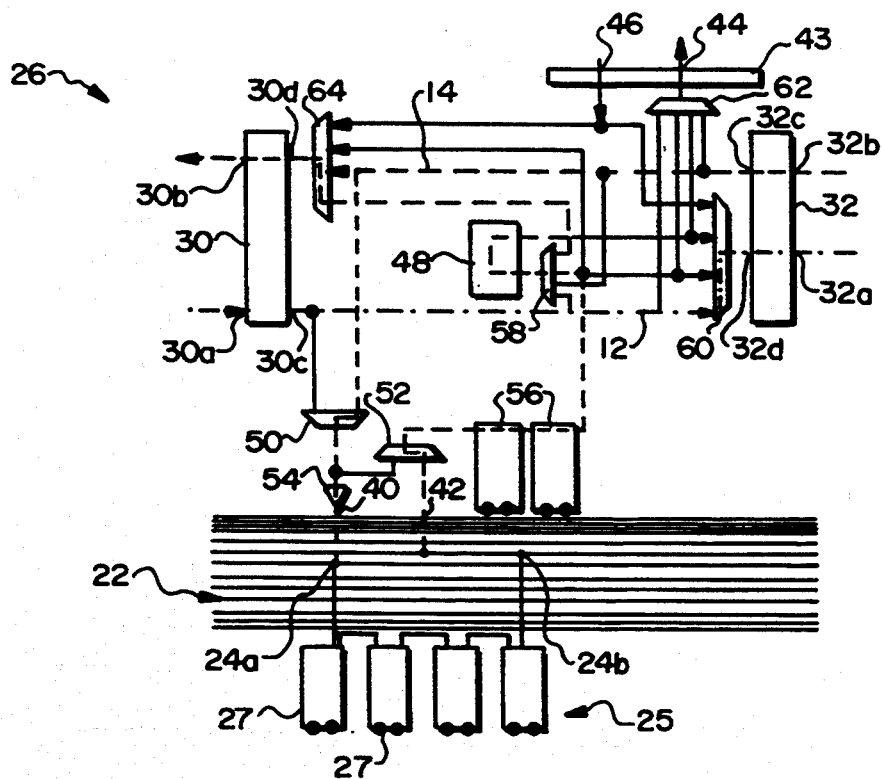
FIG. 12 shows datapaths on a card of FIG. 10 for connecting a secondary token ring to a backplane and keeping a primary token ring on the card.
Figure 13:
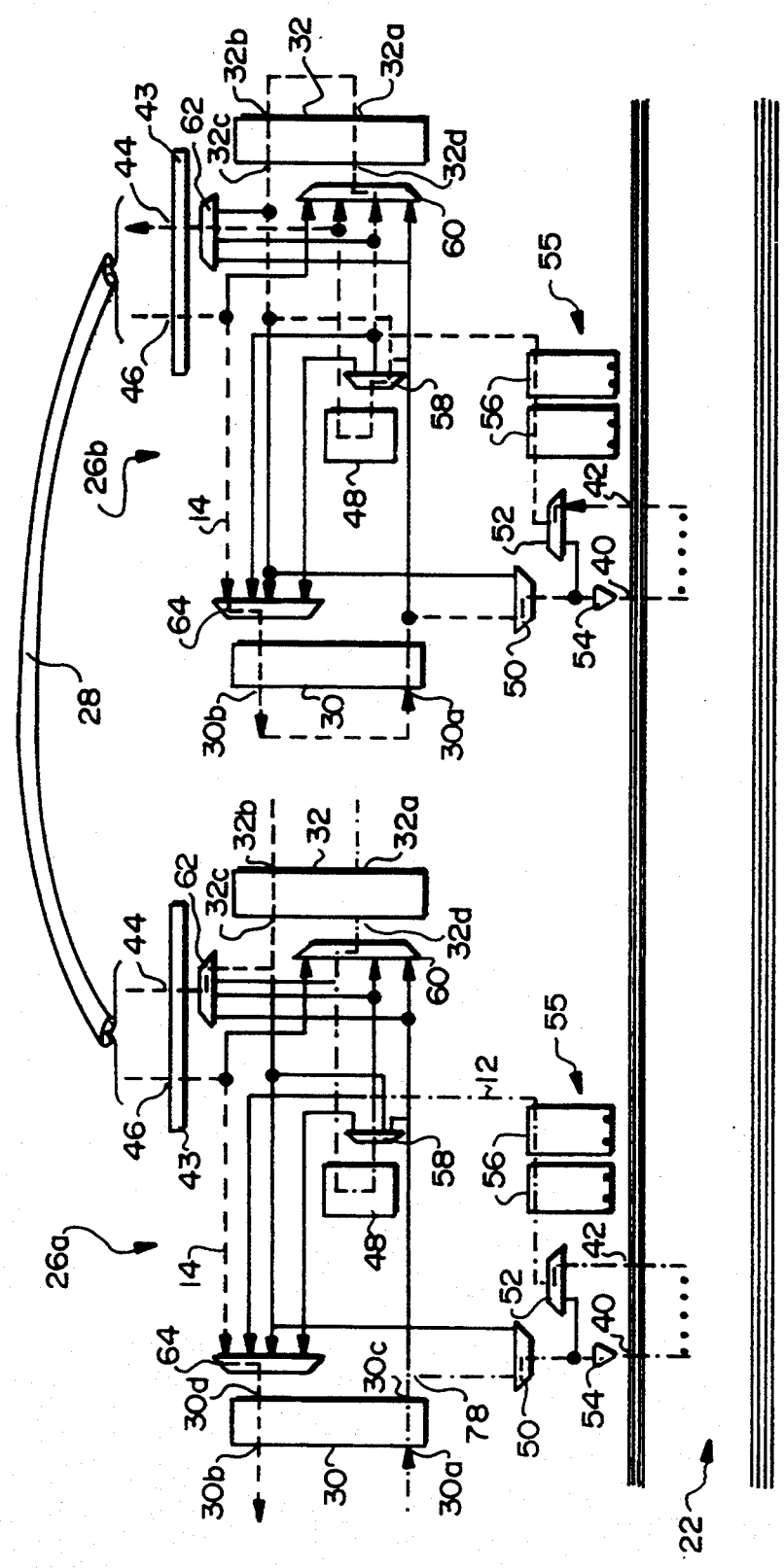
FIG. 13 depicts datapaths on two interconnected cards of FIG. 10 for connecting a primary and a secondary token ring to a backplane.
Figure 14:
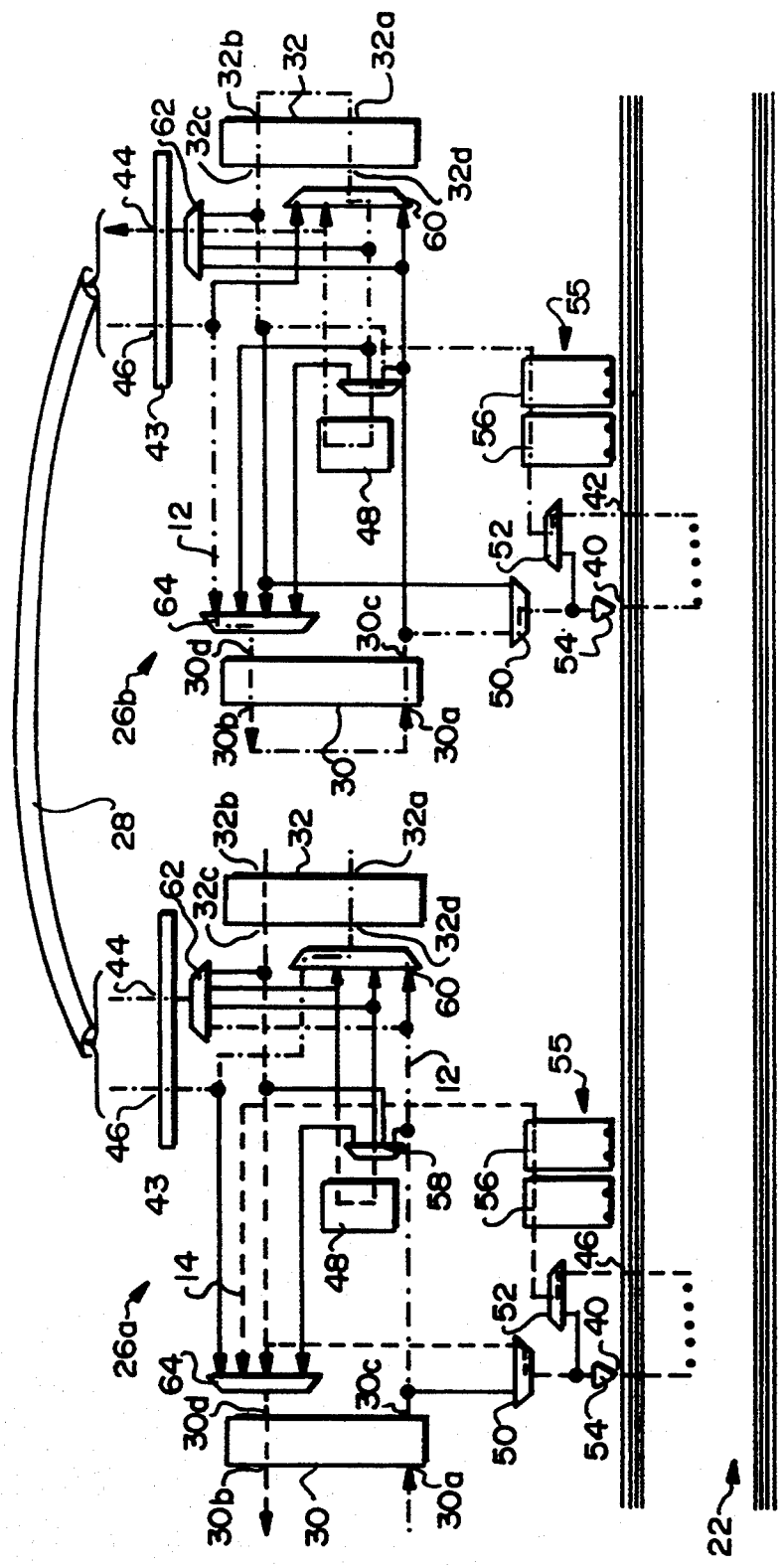
FIG. 14 shows datapaths on two interconnected cards of FIG. 10 for connecting a primary and a secondary token ring to a backplane with card reversal.
Figure 15:
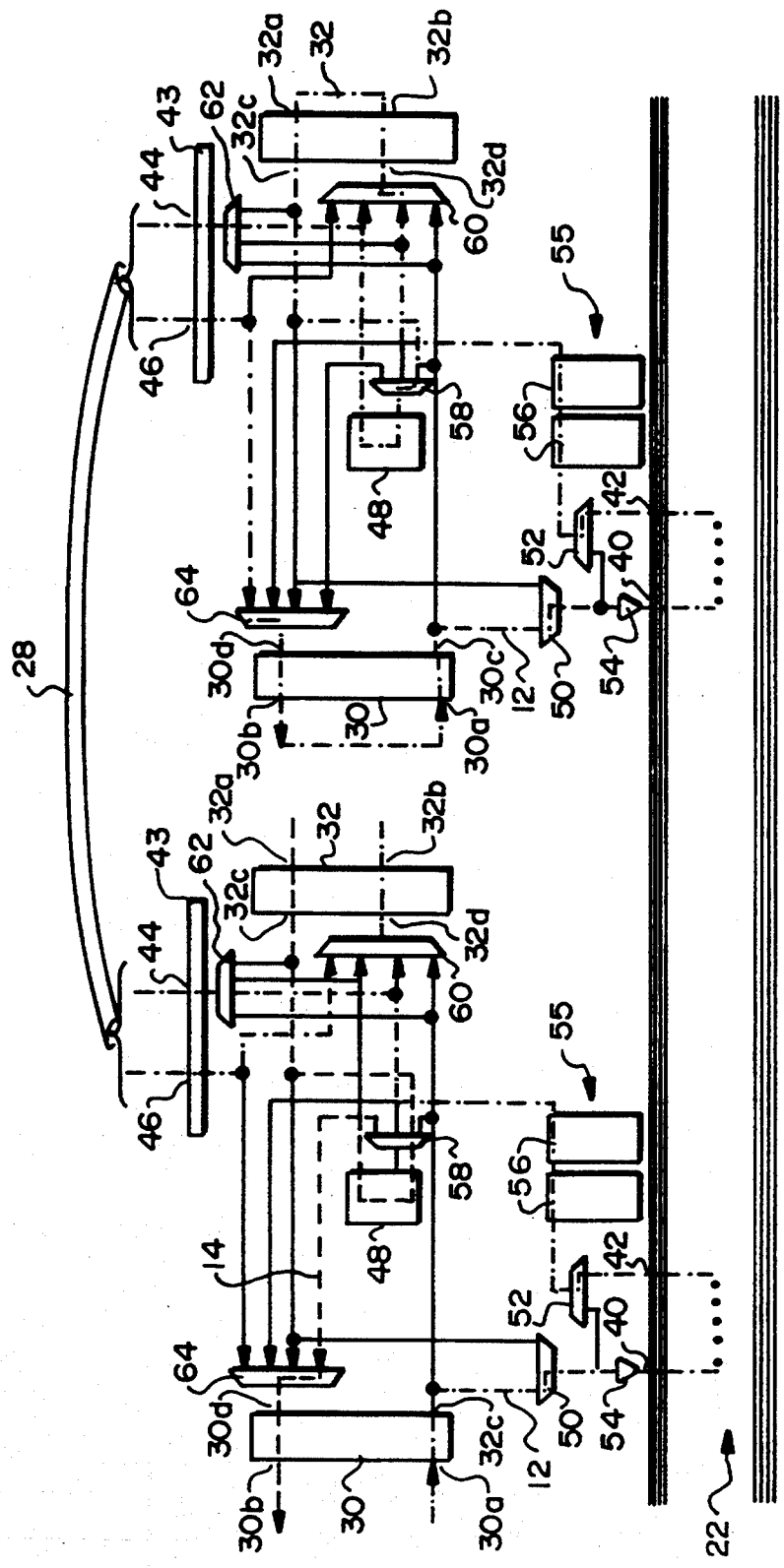
FIG. 15 shows datapaths on two interconnected cards of FIG. 10 for connecting a primary token ring to a backplane and keeping a secondary token ring on a card.

In the data path configuration shown in FIG. 12, a single card 65 transmits the signals from the secondary ring 14 through the backplane 22, and transmits the signals from the primary ring 12 directly through the card from the input port 30a to the output port 32a by way of the multiplexer 60. The secondary data path passes, as shown, through the external chain 25 connected to the backplane 22, as well as the internal M port chain 48 and the controller 36.

Two cards 65a and 65b can be connected to achieve additional functionality. FIGS. 13-16 illustrate an embodiment in which the two cards are connected by a cable 28 linking the connectors 43. The card 65a is connected directly in the rings 12 and 14, but the card 65b is not. The M port units 30 and 32 on card 65b may be connected to other devices or chains (not shown) to insert them into one of the token rings 12 or 14 by way of the connection with the card 65a. Alternatively, if no devices are connected to the M port units 30 and 32, the port units will loop back their input signals as shown in FIGS. 12-15.

Figure 17:
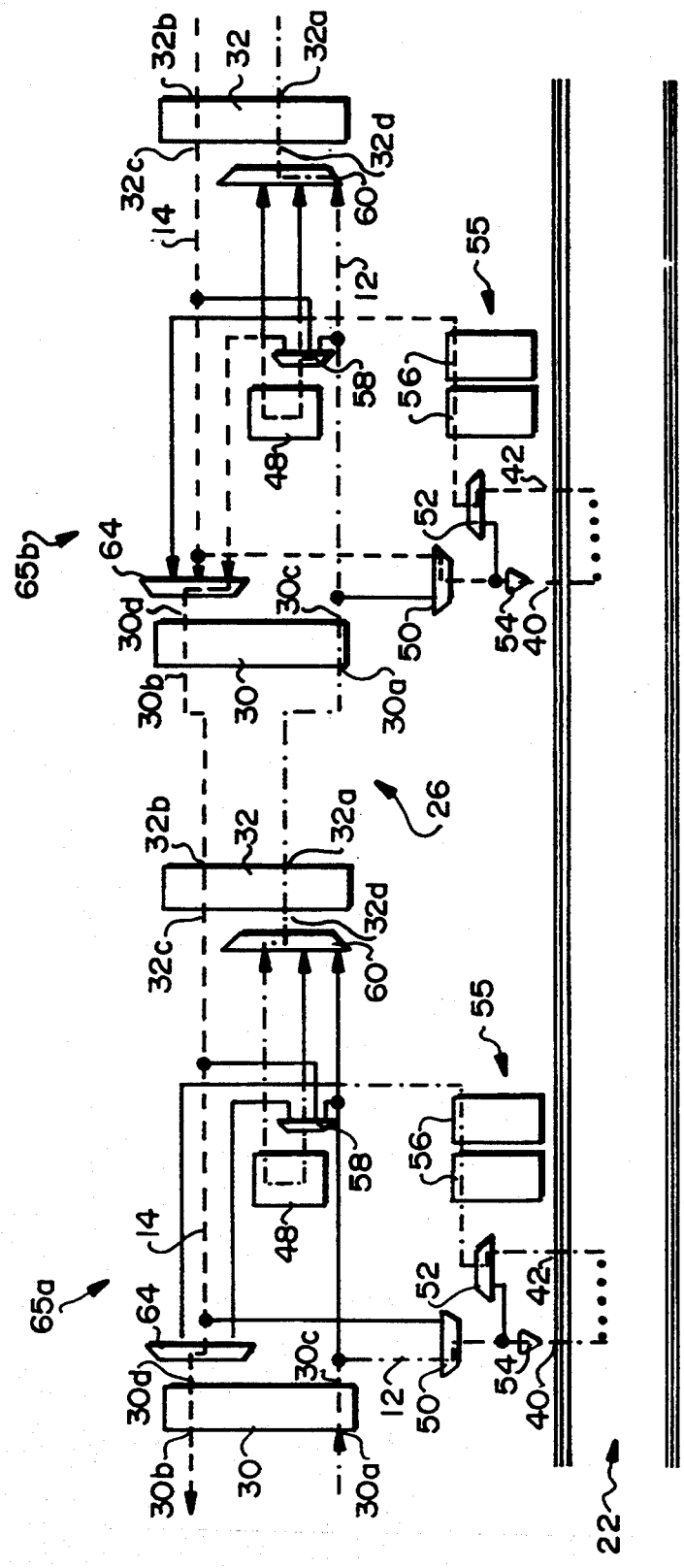
FIG. 17 shows two modified cards of FIG. 10 interconnected by an alternative means to form datapaths for connecting a primary and a secondary token ring to a backplane.
Figure 18:
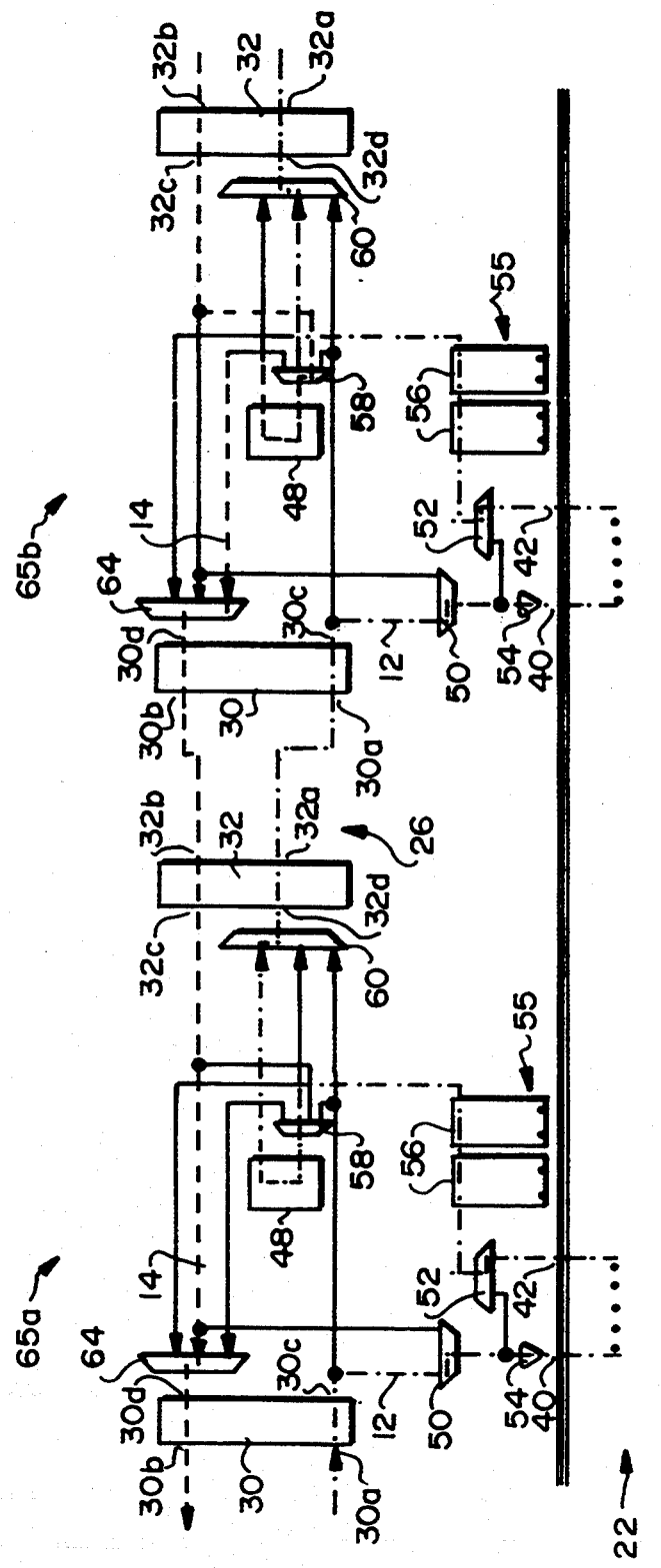
FIG. 18 shows two modified cards of FIG. 10 interconnected by an alternative means to form datapaths for connecting a primary token ring to a backplane and keeping a secondary token ring on a card.
Figure 19:
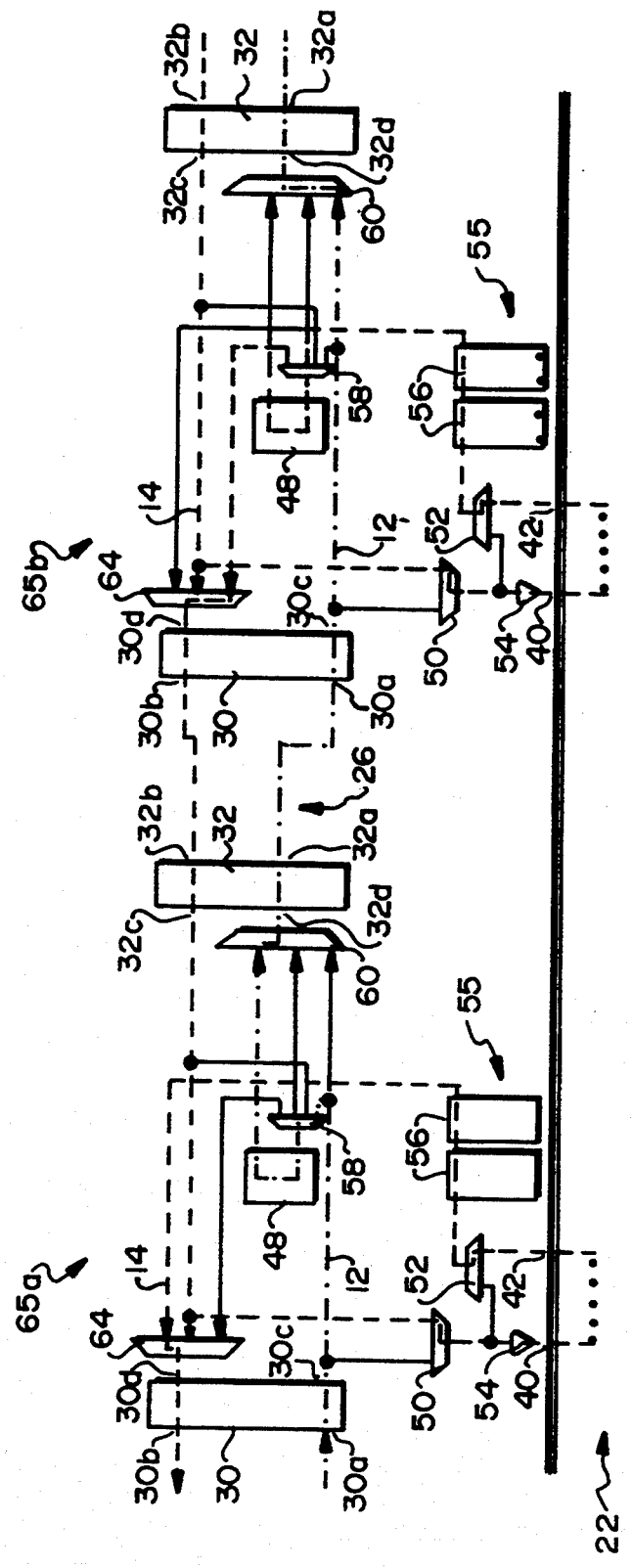
FIG. 19 shows two modified cards of FIG. 10 interconnected by an alternative means to form datapaths for connecting a secondary token ring to a backplane and keeping a primary token ring on a card.

As shown in FIGS. 17-19, two cards 66a and 66b may be connected by a cable 69 connecting the port unit 32 of the card 66a to the port unit 30 of the card 66b. The port unit 30 on card 66a is connected into the rings 12 and 14, as is the port unit 32 on card 66b. Cards 66a and 66b are the same as the card 65 of FIG. 3, except the cards 66a and 66b do not include a multiplexer 62 or a connector 43.

Figure 16:
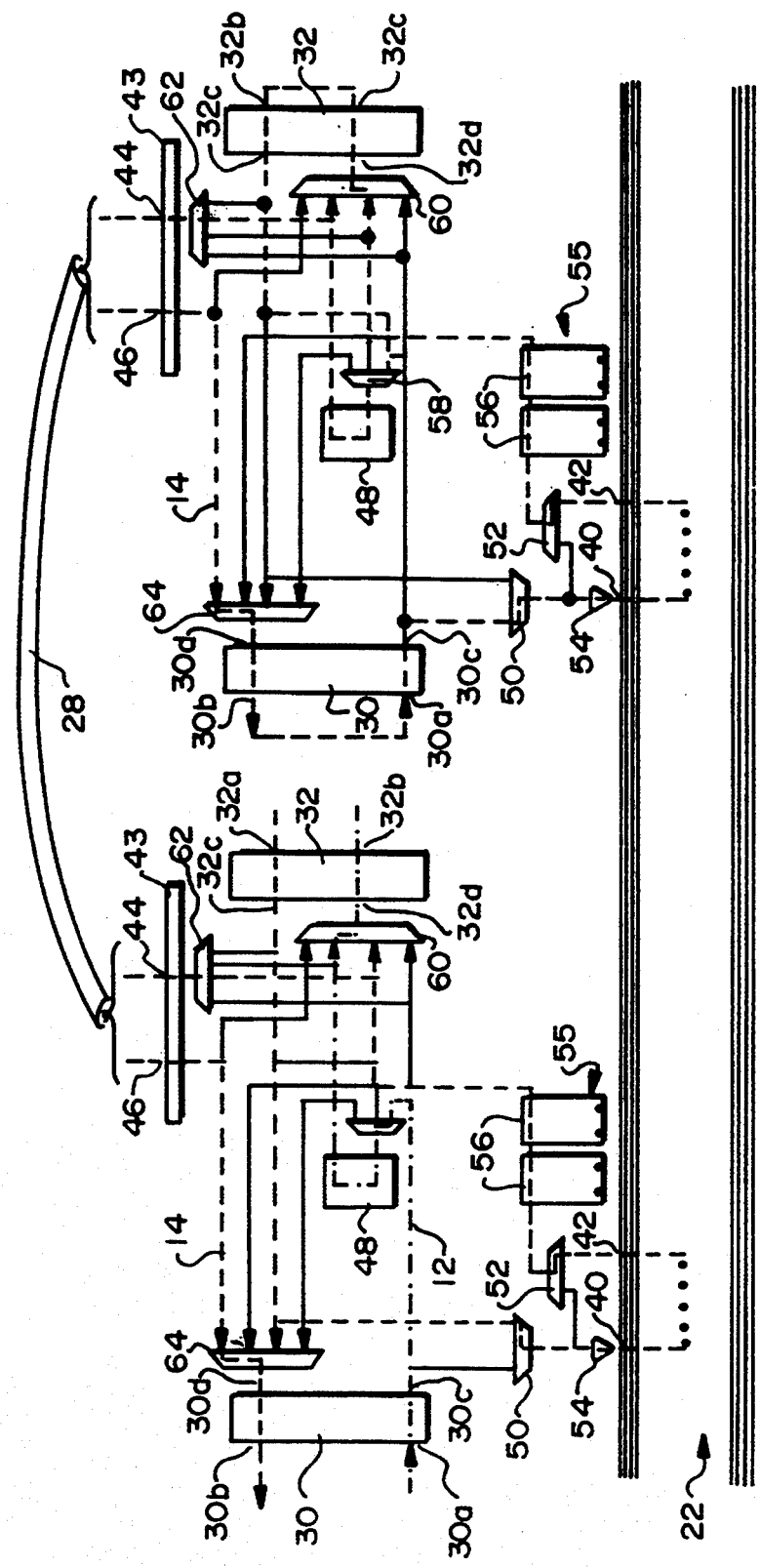
FIG. 16 shows datapaths on two interconnected cards of FIG. 10 for connecting a secondary token ring to a backplane and keeping a primary token ring on a card.

The alternative embodiment of FIGS. 13-16 may be preferable to that of FIGS. 17-19 in that it provides the two M port units 30 and 32 on the card 66b available for connections to token ring devices. In FIGS. 16-18, the port units 30 and 32 on each card are used to connect either to a token ring 12 or 14 or to the other card and, thus, cannot be connected to additional external devices.

In either case, two cards 65, connected in either of the above arrangements, permit the selection of datapaths to exchange signals between the backplane 22 and both rings 12 and 14.

Each of the above-described embodiments and configurations, can be configured for stand-alone operation such that neither ring 12 or 14 is connected to the backplane 22. This may be accomplished by configuring the datapaths so that the multiplexers select the input from internal components, for example, on card 65 from the multiplexer 50 rather than the input from the input from the backplane 22. This is useful when there are no other cards 27. When there is only one card 26 in the concentrator, this configuration frees up the backplane resources for use by other cards which may be plugged into the backplane.

In addition, each of the above-described configurations can be modified for controller-less operation. This is useful when diagnostics detect a failure to the MAC. Optionally, a connector may be added to directly drive the registers and multiplexers.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

15311-2027

APPENDIX A

X3T9/92-037
X3T9.5/84-49
REV. 7.1

FDDI
STATION MANAGEMENT (SMT)

PRELIMINARY DRAFT PROPOSED
AMERICAN NATIONAL
STANDARD

May 7, 1992

Secretariat

COMPUTER & BUSINESS EQUIPMENT MANUFACTURERS ASSOCIATION

ABSTRACT: The described STATION MANAGEMENT (SMT) protocol is intended for use in a high-performance multi-station network. This protocol is designed to be effective at 100 megabits per second using a Token ring architecture and fiber optics as the transmission medium over distances of several kilometers in extent.

*NOTE:*

*This is an internal working document of X3T9, a Technical Committee of Accredited Standards Committee (ASC) X3. As such, this is not a completed standard, but is considered to be technically complete by the X3T9.5 Task Group. The contents of this document may be modified as a result of comments received during the review process.*

POINTS OF CONTACT:

Gene Milligan (X3T9.5 Chairman)
Seagate Technology
P.O. Box 12313
Oklahoma City, OK 73157
(405) 324-3070

Floyd Ross (X3T9.5 Vice Chairman)
Ascom Timeplex
470 Chestnut Ridge Rd.
Woodcliff Lake, NJ 07675
(201) 391-6000 ext. 6613

5 GENERAL DESCRIPTION

An FDDI network consists of a set of nodes logically connected. Information is transmitted sequentially, as a stream of suitably encoded symbols, from one active node to the next. Each node generally regenerates and repeats each symbol and serves as the means for attaching one or more devices to the network for the purpose of communicating with other devices on the network. The method of actual physical attachment to an FDDI network may vary and is dependent on specific application requirements as described herein.

The basic building block of an FDDI network is the Physical Connection which consists of paired Physical Layer entities in two adjacent nodes on the FDDI network connected with a transmission medium. Connection to the physical medium, specified in PMD, is controlled by the station insertion and removal algorithms of Station Management (SMT) which are contained herein.

SMT specifies the local functions within an FDDI node necessary to manage the FDDI network. This section describes the physical and logical topologies of an FDDI network and specifies examples of allowable node configurations used for specification of SMT protocols.

5.1 Definition of an FDDI Node

A variety of internal node configurations are possible. However, a node shall have one, and only one, SMT entity. It may, however, have multiple instances of MACs, PHYs, and PMDs, with the actual number, within bounds, being implementer defined.

Several internal node configurations are defined within SMT with state machines provided to specify their operation. These fall into the general classifications of single attachment nodes and dual attachment nodes. FDDI trunk rings are normally composed of dual attachment nodes which have two Ports (each consisting of one PHY and one PMD) to accommodate the dual (counter-rotating) rings. Concentrators, which may be single attachment, dual attachment, or form the root of a tree of other FDDI nodes (null attachment), are also defined. Concentrators provide for the connection of single attachment nodes (either stations or concentrators) which have only one Port and therefore cannot directly attach to the dual ring. A dual attachment station or concentrator may also be connected to a concentrator for use as the functional equivalent of the corresponding single attachment node (or nodes if Port A and Port B are both connected to concentrators).

A single attachment node requires a minimum of one Port. A dual attachment node requires a minimum of two Ports. To be designated a station, a node requires a minimum of one MAC. Stations may have additional MACs, with MACs inserted in each of the dual rings in the case of dual attachment stations. A concentrator requires one additional Port (type M (see 5.2.4)) for each tree connection that is to be provided. Different concentrator types may or may not have any MACs. The absence of a MAC may limit the functionality of the concentrator. If it has at least one MAC(s), a MAC shall be located at the exit Port(s) (i.e., a MAC follows the stations inserted on its M ports). In general, no maximum is placed on the number of MACs that may be contained within a station or concentrator.

The six specific station and concentrator types listed below are used in describing SMT configuration and topology protocols. Figures 5-1 through 5-3 depict examples of some of these. Other internal node configurations that are interoperable with these six node types are not precluded by this standard:

Single MAC - Dual Attachment Station (SM-DAS)
    Dual MAC - Dual Attachment Station (DM-DAS)
    Single Attachment Station (SAS)
    Dual Attachment Concentrator (DAC)

Single Attachment Concentrator (SAC)
Null Attachment Concentrator (NAC)

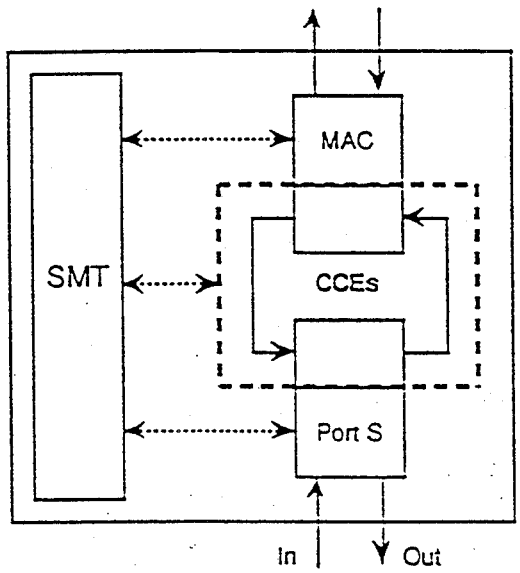

Figure 5-1 Example Single Attachment Station

FDDI nodes are differentiated by PMD entities. Each PHY/PMD pair, designated a Port, belongs to one of four types: A, B, M, or S. The type of a PMD may be indicated by the keying of the MIC receptacle (see the appropriate FDDI PMD standard).

Dual attachment nodes (DAS and DAC) may attach directly to the trunk ring. Each dual attachment node contains two Ports designated as A and B. Port A is intended to be connected to the primary ring on the incoming fiber and the secondary ring on the outgoing fiber. Similarly, Port B is intended to be connected to the incoming fiber of the secondary ring and the outgoing fiber of the primary ring. Therefore, a properly formed trunk ring is composed of a set of stations with the Port A of one station connected to the Port B of the neighboring station.

Concentrator nodes (DAC, SAC, and NAC) contain one or more Ports of type M to provide connections within the concentrator tree.

A single attachment node (SAS or SAC) has a Port of type S which is intended to be attached to a Port of type M within a concentrator tree.

Given that a node may have a variety of internal configurations, with multiple MACs, PHYs, and PMDs, consistent external behavior shall be required to claim conformance with the FDDI standards. At the discretion of an implementer, a station may be considerably more complex in its internal structure than the example configurations.

This standard does not specify implementation. Any node, regardless of its internal implementation, that conforms at its external interfaces to the requirements defined in this standard is permitted.

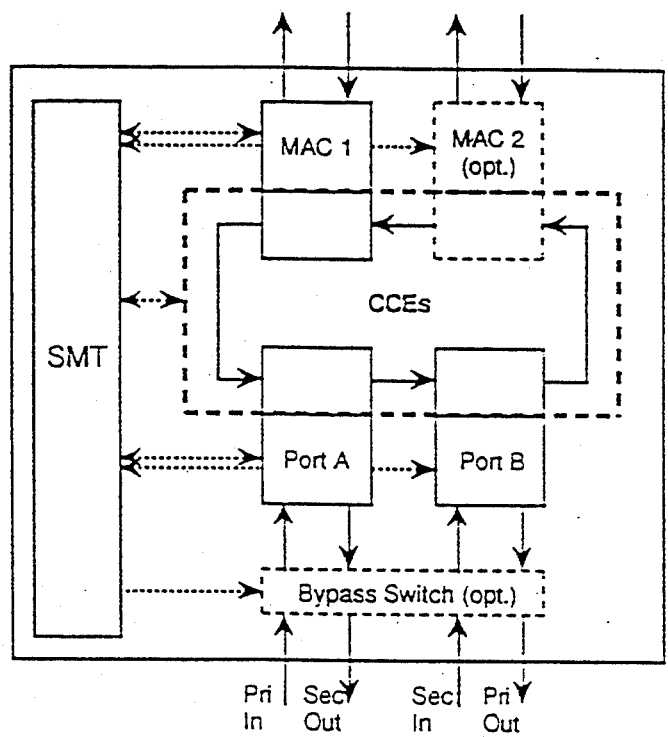

Figure 5-2 Example Dual Attachment Station

5.2 Definition of an FDDI Network

The FDDI network topology may be viewed at two distinct levels: physical and logical. Physical topology describes the arrangement and interconnection of nodes with physical connections. In contrast, logical topology describes the paths by which tokens and information flow through the network between MACs.

An FDDI network forms a dual ring of trees or a subset of a dual ring of trees physical topology. The implication on the logical topology is that at most two logical sets of MAC entities (i.e., two independent token/data paths) exist in a single, fault-free FDDI network. A set of MAC entities that are in the same token/data path is called a logical ring hereafter. The valid physical topologies are also constrained to those where physical connections and internal configurations in nodes form at most two logical rings.

The logical and physical topologies of an FDDI network are not necessarily the same. The tree structure provided through concentrators can have the token path entering and exiting the concentrator many times on the same ring, where logically, the concentrator may only appear on the ring once. Also, the number of MACs and attachments in a station need not be equal; so, a station in the trunk ring is physically in both rings but may be in only one of the logical rings.

5.2.1 Physical Topology

All physical connections in an FDDI topology are duplex links. In a fully connected trunk ring, a duplex link supports counter-rotating rings; and in a tree, the duplex link provides transmit and receive paths for one of the dual rings. Combining these two structures in an FDDI topology, as shown in Figure 5-4, produces a dual ring of trees in a fully connected network. The nodes in the network are interconnected so that at most one dual ring exists.

A subset of any legal topology is also a legal topology. An FDDI network can be configured in several different physical topologies:

- A dual ring with trees
- A dual ring without trees
- A wrapped ring with trees
- A wrapped ring without trees
- A single tree By removing physical connections and nodes from any legal FDDI topology, one or more legal FDDI topologies are formed. Subsets of legal topologies are legal topologies, so that failure of nodes or connections in an FDDI network produce legal topologies.

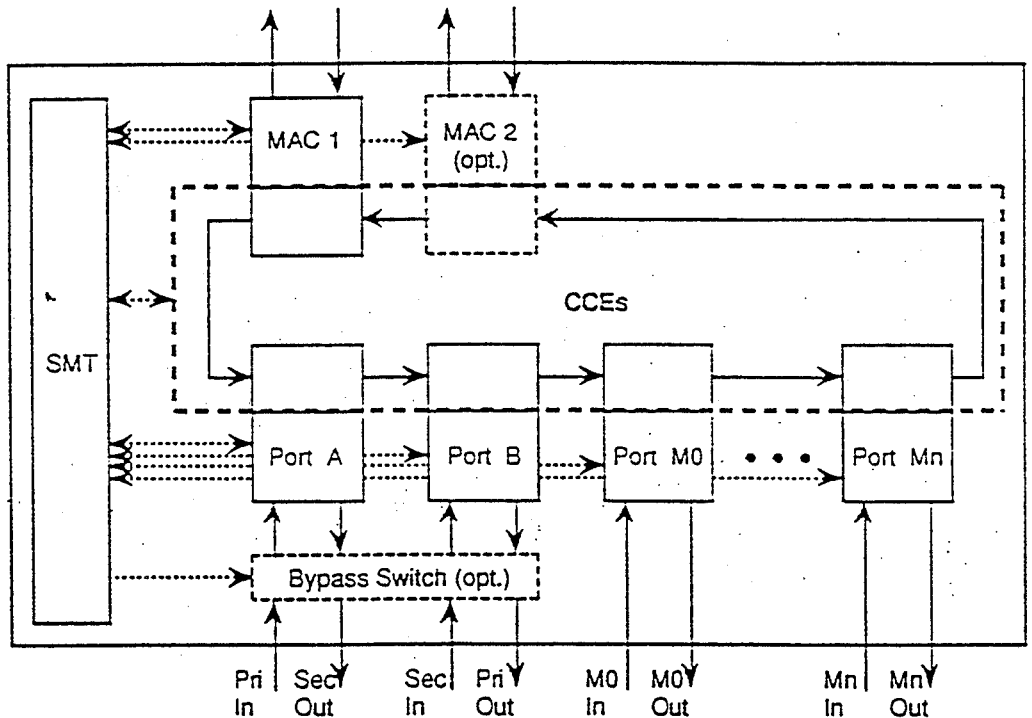

Figure 5-3 Example Dual Attachment Concentrator

5.2.2 Logical Topology

At the logical level, a single legal FDDI topology consists of at most two separate logical rings, designated as the primary and secondary rings. The two logical rings are formed from the pairs of opposing physical links that make up the Physical Layer connections. A set of dual attachment stations connected into a closed loop form two counter-rotating rings, referred to as a dual ring. Each of these counter-rotating rings is the basis of a logical ring. If a closed loop of physical connections is not present (i.e., the trunk ring is wrapped) in an FDDI topology, then only one logical ring is present.

Recovery from a single fault on the trunk ring is achieved by joining the two rings in the two nodes adjacent to the fault to create a single logical ring. This wrapped configuration with a single logical ring is also a legal topology. If only one logical ring is present in an FDDI topology, it is designated as the primary ring. Multiple non-adjacent faults on the trunk ring produce multiple FDDI topologies, each with a disjoint logical ring.

An optional recovery process from a single fault, called Global Hold, may be employed. Global Hold is a policy whereby, if both logical rings are operational and a fault is detected in one of the logical rings, then the current configuration is held and all data traffic may be switched to the fault-free logical ring.

A single concentrator may connect one, or two in the case of a DAC, trees into a logical ring. This allows either the primary, the secondary, or both logical rings to be extended to include a tree.

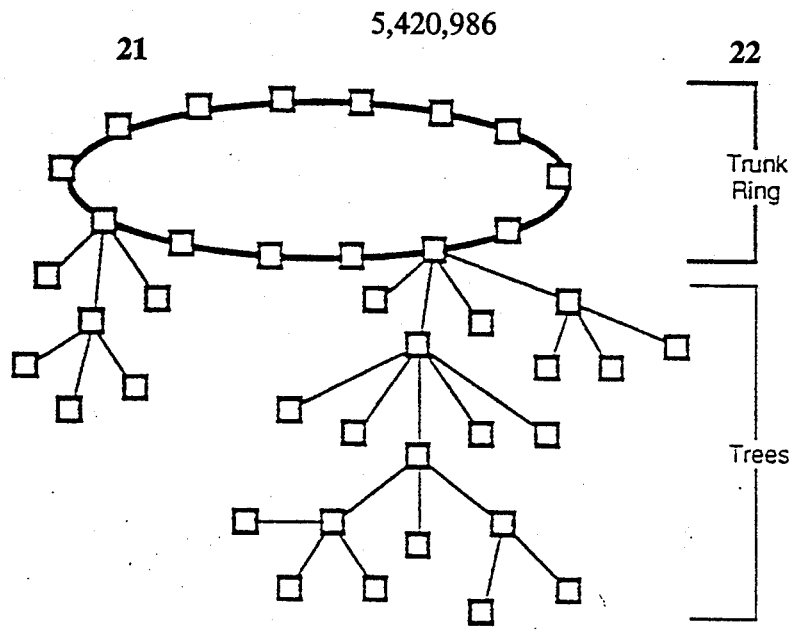

Figure 5-4 Ring of Trees Topology

5.2.3 Physical Media Topology

The Physical Media topology may contain more than one dual ring. For example, additional connections may exist to provide redundancy within the concentrator trees. These redundant connections are not included in the token path, which is limited to a single dual ring of trees, but are available as backup links. The construction of networks with redundant tree connections is allowed by the FDDI standard, but the rules for efficient utilization of these connections are not described herein.

Legal FDDI topologies may be constructed with the FDDI Physical Media by following the connection rules set for Ports when connecting FDDI nodes together. This allows legal FDDI topologies to be constructed with the FDDI Physical Media.

5.2.4 FDDI Connection Rules

The types of Ports (A, B, M, or S) at both ends of a physical connection determine the characteristics of that physical connection. These characteristics include whether the connection will be accepted or rejected, whether SMT will be notified of potential connection problems, and the connection mode that will be established. Connections may be rejected to prevent the establishment of illegal or undesirable topologies. A connection may also be rejected in a neighboring node because of that node's inability to support the connection. The connection rules matrix that follows summarizes the validity of and the action to be taken for each type of connection:

|  |  | Other Port | | | |
|---|---|---|---|---|---|
|  |  | A | B | S | M |
| This Port | A | V,U | V | V,U | V,W |
|  | B | V | V,U | V,U | V,W |
|  | S | V,U | V,U | V | V |
|  | M | V | V | V | I,U | where:
    V indicates a valid connection
    I indicates an illegal connection
    U indicates an undesirable connection with notification to SMT required
    W indicates, if Active, prevent THRU in CFM and Port B takes precedence (with defaults)

The detailed connection rules for a specific Port (this Port) to other Ports are:

A to A     Undesirable peer connection that creates twisted primary and secondary rings, notify SMT.

A to B     Normal trunk ring peer connection.

| | |
|---|---|
| A to S | Undesirable peer connection that creates a wrapped ring, notify SMT. |
| A to M | Tree connection with possible redundancy. Node shall not go to THRU state in CFM. My Port B shall have precedence(with defaults) for connecting to a Port M in a single MAC node. |
| B to A | Normal trunk ring peer connection. |
| B to B | Undesirable peer connection that creates twisted primary and secondary rings, notify SMT. |
| B to S | Undesirable peer connection that creates a wrapped ring, notify SMT. |
| B to M | Tree connection with possible redundancy. Node shall not go to THRU state in CFM. My Port B shall have precedence(with defaults) for connecting to a Port M in a single MAC node. |
| S to A | Undesirable peer connection that creates a wrapped ring, notify SMT. |
| S to B | Undesirable peer connection that creates a wrapped ring, notify SMT. |
| S to S | Connection that creates a single ring of two slave stations. |
| S to M | Normal tree connection. |
| M to A | Tree connection that provides possible redundancy. |
| M to B | Tree connection that provides possible redundancy. |
| M to S | Normal tree connection. |
| M to M | Illegal connection that creates a tree of rings topology. |

When either Port A or Port B is connected to a Port M and the other Port is connected to a Port A, a Port B, or a Port S, then either connection may be withheld in a deterministic manner as specified herein (see 9). This avoids a dual attachment station attempting to form part of a tree at one of its ports and part of a dual ring at the other port.

In the case of an undesirable connection, whether to accept or reject the connection depends upon the connection policies adopted by the stations involved in the connection. The rule is to accept the connection if at least one node's policy is to allow such a connection, and to reject the connection if both nodes have a policy that disallows such a connection.

5.3 Overview of SMT Functions

SMT is described herein in terms of various subcomponent functions. These are summarized, on a section by section basis, as follows.

Section 6 specifies the services between SMT and other entities. Subsections 6.1 through 6.3 specify the SMT services with the MAC, PHY, and PMD entities within the same node, whereas subsection 6.4 specifies the services provided by SMT to System Management, and includes specification of the Management Information Base (MIB) of SMT.

Section 7 specifies the frame formats and protocols used to manage stations in an FDDI ring on a peer-to-peer basis. Included, for instance, is the Neighbor Information Frame (NIF) that is used to periodically announce basic station description information, and the Status Information Frame (SIF) that is used to request and provide a station's operating and configuration information.

Also included in section 7 are Status Report Frame (SRF) and Parameter Management Frame (PMF) types which are used in conjunction with the protocols specified in section 8 to provide for remote management of nodes. Complete access to the MIB with read/write capabilities matching those locally available are specified.

Section 9 specifies the Connection Management (CMT) for a node. CMT supports the wide variety of physical and logical topologies described earlier in this section. CMT controls the establishment of a media attachment to the FDDI network, the connections with other nodes in the ring, and the internal configuration of the various entities within a station. CMT includes provision for a link confidence test and also specifies a Link Error Monitor (LEM) which monitors active links, on a link-by-link basis, to ensure that failing links are detected and, if required, removed from the network.

Section 10 specifies the Ring Management (RMT) function which monitors MAC operation and takes actions necessary to aid in achieving an operational ring. RMT occurs on a per MAC basis and aids in the detection and resolution of failures, such as stuck beaconing and the presence of duplicate addresses, that can have a global significance.

What is claimed is:

1. A token ring concentrator for connecting one or more devices to a token ring, said concentrator comprising:

a plurality of ports at least one of which is a backplane port, each of said ports having an input line and an output line and one or more of said ports connecting, respectively, to one or more of the devices;

a plurality of multiplexers with selectable input lines, the multiplexers connected to input and output lines of said ports and arranged to direct signals on selected lines between the output lines and the inputs lines of said ports; and a controller arranged as a token ring node, said controller controlling the selections of the input lines of said multiplexers to select data paths between at least a first port and at least a second port, one of which may be said backplane port, said controller selecting independent data paths associated with a first token ring, a second token ring or both of said rings.

2. The token ring concentrator of claim 1, wherein the plurality of ports includes at least a second backplane port.

3. The token ring concentrator of claim 2, wherein the backplane ports are configurable to connect to each other, to the first token ring, or to the second token ring.

4. The token ring concentrator of claim 2, said controller controlling the selections of the input lines of said multiplexers to select data paths between one or both of said backplane ports and at least one of said other ports.

5. The token ring concentrator of claim 1, wherein the concentrator includes at least one port which is configured to receive signals on a first token ring and to transmit signals on a second token ring.

6. The token ring concentrator of claim 5, said controller controlling the selections of the input lines of said multiplexers to select data paths to include in the first token ring one or more devices connected through one or more of said ports.

7. The token ring concentrator of claim 5, said controller controlling the selections of the input lines of said multiplexers to select data paths to switch one or more devices connected to the first token ring through one or more ports and connect the devices to the second token ring.

8. A concentrator as in claim 1 wherein said controller includes a register, the contents of which control the selections of the input lines of said multiplexers, and said controller sets the contents of said register.

9. The token ring concentrator of claim 1, said concentrator further comprising a multi-channel backplane, said backplane ports being configurable to connect to the backplane by connecting to one or more of the channels in the backplane.

10. A token ring concentrator for connecting a device to a token ring, said concentrator comprising:

a first end port, said port having an input line and an output line;

a second end port, said port having an input line and an output line;

a chain of front ports, each of said front ports configured to connect with a device, a first port in said chain of front ports being connected to receive signals from said first end port;

a backplane port, said port having an input line and an output line;

a plurality of multiplexers with multiple input lines, the multiplexers connected to input and output lines of the ports and arranged to direct signals on selected lines between said ports; and a controller arranged as a token ring node, said controller controlling the selections of the input lines of said multiplexers to select data paths between said first end port and said second end port wherein one of the data paths so selected may include said backplane port.

11. The token ring concentrator of claim 10, further comprising:

a second backplane port;

said controller controlling the selections of the input lines of said multiplexers to select data paths between said first and second end ports and one or both of said first and second backplane ports.

12. The token ring concentrator of claim 11, wherein said plurality of multiplexers includes:

a first multiplexer connected to select among inputs from the last port in said chain of front ports and said first backplane port and to provide token ring input signals for said controller;

a second multiplexer connected to select among inputs from said last port in said chain of front ports, said controller and said first backplane port and to provide the input signals for said second end port;

a third multiplexer connected to select among inputs from said second end port, said last port in said chain of front ports and said controller and to provide the input signals for said first backplane port; and a fourth multiplexer connected to select among inputs from said controller, said second end port and said first backplane port and to provide the input signals for said second backplane port.

13. A token ring concentrator as defined in claim 12, wherein said first multiplexer is further connected to receive and select an input from said controller.

14. A token ring concentrator assembly comprising a first concentrator and a second concentrator, the concentrator assembly operating within a system that utilizes A ports, that connect to the incoming first ring and the outgoing second ring of the token ring network, B ports, that connect to the outgoing first ring and the incoming second ring, M ports that operate only on a concentrator and connect the concentrator to a station or to another concentrator connected to the same incoming and outgoing ring, and S ports which operate on a station or a concentrator and connect a concentrator to a single attachment station or a single attachment concentrator to the same incoming and outgoing ring, the concentrator assembly including:

A. said first concentrator includes:

i. a plurality of ports, wherein each port is configurable as an A, B, M or S port and a first end port is configured to receive signals on a first token ring and to transmit signals on a second token ring said ports each including an input line and an output line;

ii. a plurality of multiplexers arranged to direct signals between said ports and a controller, said multiplexers connecting to input and output lines of said ports, and each of said multiplexers capable of selecting among a plurality of inputs; and iii. said controller, arranged as a token ring node and having token ring inputs and outputs, said controller controlling the selections of inputs of said multiplexers to select data paths between said first end port and said other ports, at least two of which are ports which connect to the backplane; and B. said second concentrator, which is identical to the first concentrator includes:
   i. a second end port which is configured to transmit signals on the first token ring and receive signals on the second token ring;
   ii. wherein a port of said second concentrator which connects to the backplane connects to channels of the backplane which are connected to a backplane port of said first concentrator; and
   iii. the first end port of said second concentrator is configured to receive signals from a port connected to the backplane and send the signals to a port not connected to the backplane.

15. The token ring concentrator assembly of claim 14, wherein said first concentrator connects to the first token ring through a port which connects to the backplane and said second concentrator connects to the second token ring through a port which connects to the backplane.

16. The token ring concentrator assembly of claim 14, said assembly further including one or more additional identical concentrators, one of said concentrators connecting, through a backplane port which connects to the backplane, to either of said first concentrator or said second concentrator, which is connected through a backplane port to the backplane, and
other additional concentrators connecting to each other through backplane ports connected to the backplane.

17. A token ring concentrator for connecting one or more devices to a token ring, said concentrator comprising:
   a plurality of ports, each of said ports having an input line and an output line with at least one of said ports being a backplane port;
   a controller arranged as a token ring node;
   a plurality of multiplexers with input lines and output lines, said multiplexers connecting to said ports and at least one multiplexer connecting also to said controller, said multiplexers arranged to direct signals between said ports and said controller, with each of said multiplexers being capable of selecting one input line from among a plurality of the multiplexer input lines; and
   said controller controlling the selections of the input lines of said multiplexers to select data paths between at least a first port and at least a second port, said controller selecting independent data paths between said ports.

18. The token ring concentrator of claim 17, wherein the concentrator includes at least one port which is configured to receive signals on a first token ring and to transmit signals on a second token ring.

19. The token ring concentrator of claim 18, said controller controlling the selections of the input lines of said multiplexers to select data paths to include in the first token ring one or more devices connected through one or more of said ports.

20. The token ring concentrator of claim 18, said controller controlling the selections of the input lines of said multiplexers to select data paths to switch one or more devices connected to the first token ring through one or more ports and connect the devices to the second token ring.

* * * * *